United States Patent
Kitano et al.

(10) Patent No.: US 7,224,510 B2
(45) Date of Patent: May 29, 2007

(54) REVERSIBLE IMAGE DISPLAY SHEET AND IMAGE DISPLAY

(75) Inventors: Hajime Kitano, Tokyo (JP); Gaku Yakushiji, Tokyo (JP); Kazuya Murata, Tokyo (JP); Norio Nihei, Tokyo (JP); Koji Takagi, Kanagawa (JP); Yoshitomo Masuda, Tokyo (JP); Takahiro Kawagoe, Saitama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/495,782

(22) PCT Filed: Nov. 21, 2002

(86) PCT No.: PCT/JP02/12185

§ 371 (c)(1),
(2), (4) Date: Oct. 27, 2004

(87) PCT Pub. No.: WO03/044596

PCT Pub. Date: May 30, 2003

(65) Prior Publication Data

US 2005/0052402 A1 Mar. 10, 2005

(30) Foreign Application Priority Data

| Nov. 21, 2001 | (JP) | ............................. 2001-356013 |
| Nov. 21, 2001 | (JP) | ............................. 2001-356014 |
| Nov. 21, 2001 | (JP) | ............................. 2001-356016 |
| Dec. 17, 2001 | (JP) | ............................. 2001-382847 |
| Dec. 17, 2001 | (JP) | ............................. 2001-382848 |
| Dec. 26, 2001 | (JP) | ............................. 2001-393055 |
| Apr. 26, 2002 | (JP) | ............................. 2002-125756 |

(51) Int. Cl.
G02B 26/00 (2006.01)

(52) U.S. Cl. ....................... 359/296; 359/295; 345/107

(58) Field of Classification Search ................ 359/290, 359/296, 238; 345/107
See application file for complete search history.

(56) References Cited

U.S. PATENT DOCUMENTS 6,323,989 B1 * 11/2001 Jacobson et al. ........... 359/296

(Continued)

FOREIGN PATENT DOCUMENTS

JP 2001-290178 A 10/2001

(Continued)

OTHER PUBLICATIONS

International Search Report, PCT/JP02/12185, Mar. 4, 2003.

*Primary Examiner*—Timothy Thompson
(74) *Attorney, Agent, or Firm*—Sughrue Mion, PLLC

(57) ABSTRACT

A reversible image display panel which comprises a pair of substrates one of which is transparent and a group of particles charged with single polarity, a group of particles with single color charged with single polarity, a group of particles having portions with different colors and different charge characteristics, or two groups of particles with different charge characteristics each enclosed between the substrates, characterized in applying an electric field across the substrates, and displaying images by flying and moving the particles. The reversible image display panel and the image display device in accordance with the invention have fast response speed and simple structure, being superior in stability and vividity. In an occasion of driving, generation of the strong electric field is unnecessary for them and accordingly, electric circuits can be assembled employing general purpose electronic materials.

6 Claims, 10 Drawing Sheets

U.S. PATENT DOCUMENTS 6,657,612 B2 * 12/2003 Machida et al. ............ 345/107
6,741,385 B2 *  5/2004 Ikeda et al. ................. 359/296
6,774,879 B2 *  8/2004 Miyamoto et al. ........... 345/84

FOREIGN PATENT DOCUMENTS

JP        2001-312225 A    11/2001

* cited by examiner (a)

(b)

(c)

(a)

(b)

(c)

(a)

(b)

(c)

REVERSIBLE IMAGE DISPLAY SHEET AND IMAGE DISPLAY

TECHNICAL FIELD

The present invention relates to a reversible image display panel and an image display device each enables to repeatedly display or eliminate images accompanied by flight and movement of particles utilizing Coulomb force, etc.

BACKGROUND ART

As an image display device substitutable for liquid crystal device (LCD), image display devices (displays) with the use of technology such as an electrophoresis method, an electrochromic method, a thermal method, dichroic-particles-rotary method are proposed.

As for these image display device, it is conceivable as inexpensive visual display device of the next generation from a merit having wide field of vision close to normal printed matter, having smaller consumption power, and having a memory capability in comparison with LCD, spreading out to a display for portable device, and an electronic paper is expected.

Recently, electrophoresis method is proposed that micro-encapsulate dispersion liquid made up with dispersion particles and coloration solution and dispose the liquid between faced substrates. However, in the electrophoresis method, there is a problem that a response speed is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of micro-encapsulation, cell size is diminished to a micro-capsule level in order to make it hard to appear, however, an essential problem was not overcome at all.

Besides the electrophoresis method using behavior in the solution as above-mentioned, recently, a dry visual display system (device) for displaying reversible images wherein two kinds of particles which are different in color and charging polarity are placed between a pair of substrates, and an electric field is given to fly and fix the particles to the substrates in different direction without using solution is proposed. [The Imaging Society of Japan "Japan Hardcopy'99" (Jul. 21-23, 1999) Transaction Pages 249-252, etc.]

Movement mechanism of such a dry visual display device employs as display device with material mixed two kinds in color and charging polarity are an electrode substrate and apply the voltage to generate an electric field between electrode substrates for flying the charged particle which have different polarity to a different direction.

In this system (device), an attracting force caused by Coulomb force between particles each other, an electric imaging force with an electrode plate, an intermolecular force, further, a solution cross-linking force, gravities and so on are considered as the force applied on the particles. The flight of the particles starts when the force working on the particles by an electric field exceeds those total forces. Then, each particles form patterns and contrasts by differences of the hue resulting in making viewers recognize the patterns. The higher the contrast, the better the visibility of the displaying means.

Further, this system has advantages that the migration resistance of the particles is small, and that the response speed is fast because it is not electrophoresis method but dry visual display system.

However, with such a dry visual display device, there were the problems as the following:
(1) The structure becomes complicated because a charge transport layer and a charge generation layer are disposed.
(2) It is difficult to constantly dissipate charges from electroconductive particles, therefore two kinds of particles electrostatically aggregate while repeating display thereby not respond to electrostatic field, resulting in short longevity and lack of stability.
(3) Colors become indistinct and lack luminance because the system utilizes the reflected-light from the particles for the display, resulting in the degradation of a vivid image display.
(4) Because a generation of strong electric field is necessary in an occasion of driving, and because a design of the electric circuit that can bear the strong electric field, general purpose electronic materials are not employable.

SUMMARY OF THE INVENTION

The present invention relates to a new type of a reversible image display panel zealously developed under the situation as above-mentioned. An object of the invention is to provide a dry reversible image display panel and image display device satisfying the following requirement:
(a) They have fast response speed.
(b) The structures are simple.
(c) They are superior in stability. (Longevity while repeatedly displaying images is long.)
(d) They are superior in vividity.
(e) In an occasion of driving, generation of the strong electric field is unnecessary for them and accordingly, electric circuits can be assembled employing general purpose electronic materials.

As a result of repeated zealous study by the inventors of the present invention to achieve the object, they found the following knowledge and based on the knowledge, they completed the present invention.
(1) Enclosing two groups of particles with different charge characteristics between a pair of facing transparent substrates comprising a backlight, a color filter and two pairs of electrode, and across the substrates, an electric field being applied; then, displaying images by flying and moving the particles, an reversible image display panel with fast response speed and simple structure, being superior in stability and vividity is obtainable.
(2) Enclosing a group of particles having single color and charged with single polarity between a pair of facing substrates one of which is transparent, and across the substrates, an electric field being applied; then, displaying images by flying and moving the particles, an reversible image display panel with fast response speed and without electrostatic aggregation between the particles, being superior in repetition durability is obtainable.
(3) Enclosing a group of particles charged with single polarity between a pair of facing transparent substrates comprising a backlight, two kinds of electrodes, and a color filter, and across the substrates, an electric field being applied; then, displaying images by flying and moving the particles, an reversible image display panel with fast response speed and without electrostatic aggregation between the particles, being superior in repetition durability is obtainable.

(4) Enclosing two groups of particles with different charge characteristics between a pair of facing substrates one of which is transparent, disposing a color plate on any one of the substrate, further providing at least two pairs of facing electrodes, applying voltage across the substrates in a manner that the electric potential on one electrode is higher than the electric potential on another electrode; then, displaying images by flying and moving the particles caused by the electric field induced by the applied voltage enables image display with fast response speed and simple structure, being superior in stability and vividity.

(5) A reversible image display panel which comprises a pair of facing substrates at least one of which is transparent and a group of particles enclosed between the substrates, characterized in applying an electric field across the substrates, and displaying images by flying and moving the particles, wherein at least one kind of the particles have portions with different colors and different charge characteristics does not require generating strong electric field in an occasion of driving, and accordingly, electric circuits can be assembled employing general purpose electronic materials.

The first aspect to the fifth aspect of the present invention below was achieved by the foregoing knowledge. -Namely, the first aspect of the invention provides a reversible image display panel which comprises a pair of facing transparent substrates comprising a backlight, a color filter and two pairs of electrodes, further comprises two groups of particles with different charge characteristics enclosed between the substrates, characterized in applying an electric field across the substrates, and displaying images by flying and moving the particles.

The second aspect of the invention provides a reversible image display panel which comprises a pair of substrates one of which is transparent and a group of particles having single color and charged with single polarity enclosed between the substrates, characterized in applying an electric field across the substrates, and displaying images by flying and moving the particles.

The third aspect of the invention provides a reversible image display panel which comprises a pair of facing transparent substrates comprising a backlight, two kinds of electrodes, and a color filter, further comprises a group of particles charged with single polarity enclosed between the substrates, characterized in applying an electric field across the substrates, and displaying images by flying and moving the particles.

The fourth aspect of the invention provides a reversible image display panel which comprises a pair of facing substrates one of which is transparent, a color plate disposed on any one of the substrate, at least two pairs of facing electrodes and two groups of particles with different charge characteristics enclosed between the substrates, characterized in applying voltage across the substrates in a manner that the electric potential on one electrode is higher than the electric potential on another electrode, and displaying images by flying and moving the particles caused by the electric field induced by the applied voltage.

The fifth aspect of the invention provides a reversible image display panel which comprises a pair of facing substrates at least one of which is transparent and a group of particles enclosed between the substrates, characterized in applying an electric field across the substrates, and displaying images by flying and moving the particles, wherein at least one kind of the particles have portions with different colors and different charge characteristics.

The sixth aspect of the invention provides an image display device which comprises the reversible image display panel according to any one of the first aspect to the fifth aspect of the invention.

THE MOST PREFERRED EMBODIMENT TO CARRY OUT THE INVENTION

The first aspect of the invention provides a reversible image display panel which comprises a pair of facing transparent substrates comprising a backlight, a color filter and two pairs of electrodes, further comprises two groups of particles with different charge characteristics enclosed between the substrates, characterized in applying an electric field across the substrates, and displaying images by flying and moving the particles.

In the present invention, an attracting force caused by Coulomb force between particles each other, an electric imaging force with an electrode plate, an intermolecular force, further, a solution cross-linking force, gravities and so on are considered as the force applied on the particles.

The structures and operating principles about embodiments of the reversible image display elements in the reversible display panel of the first aspect of the present invention will be described with regards to the drawings below.

Figure 1:
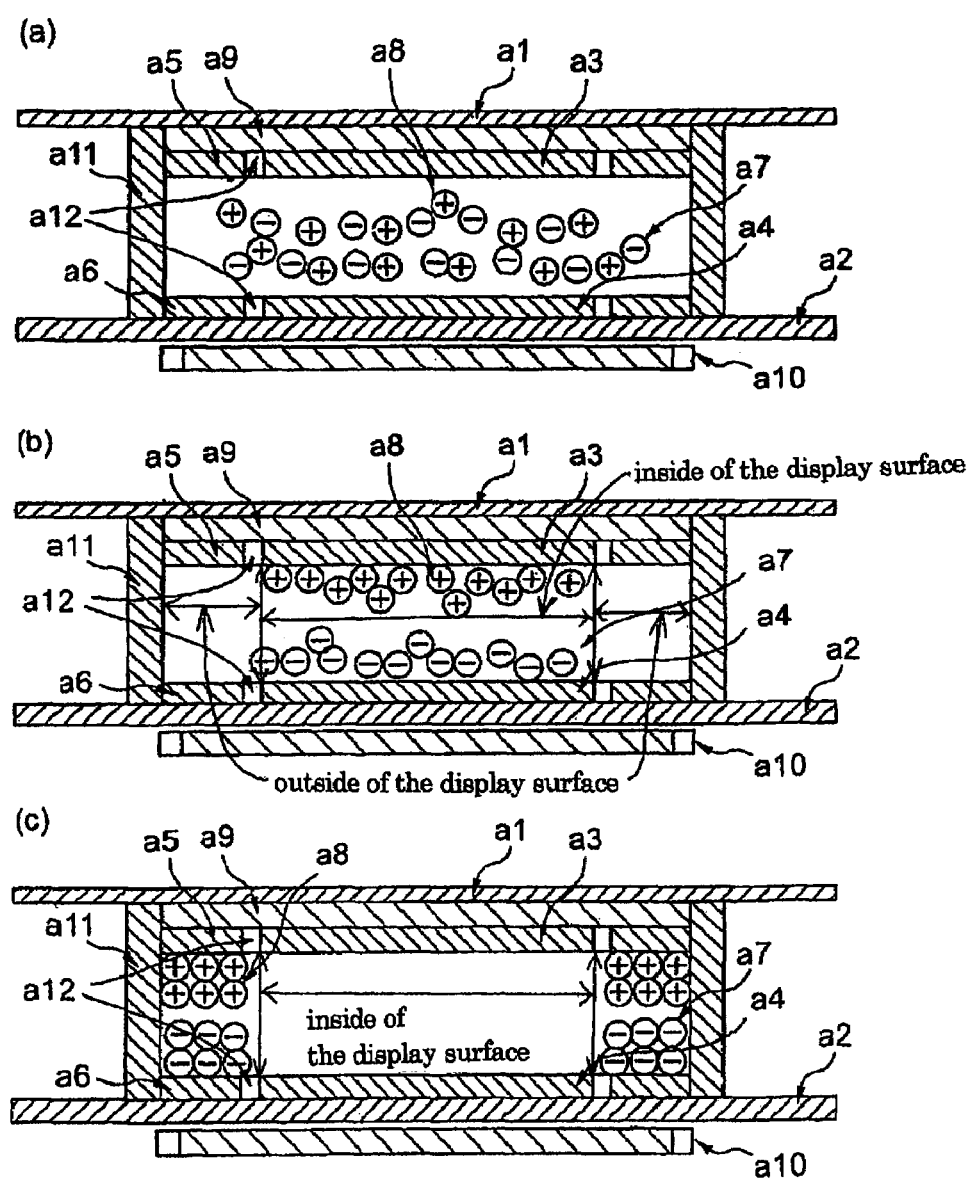
FIGS. 1 and 2 are drawings each illustrating structures and operating principles about embodiments of the reversible image display elements in the reversible display panel of the first aspect of the present invention.

In FIG. 1, color filter a9, transparent electrode (A electrode) a3 and C electrodes a5 separated by insulating articles a12 ("a" twelve) are disposed inside the transparent display substrate a1 ("a" one). Further, transparent electrode (B electrode) a4 and D electrodes a6 separated by insulating articles a12 ("a" twelve) are disposed inside the opposed substrate a2 (opposite side of the display substrate). They are illuminated from outside of the transparent opposed substrate a2 by means of backlight a10 ("a" ten).

FIG. 1 (*a*) illustrates the state where a group of negatively chargeable particles a7 and a group of positively chargeable particles a8 are enclosed between a pair of facing transparent substrates.

In this situation, when a voltage is applied from the power source in a manner that the A electrode a3 side corresponds to a negative electrode and the B electrode a4 side corresponds to a positive electrode, the group of positively chargeable particles a8 will fly and move towards the A electrode a3 side and the group of negatively chargeable particles a7 will fly and move towards B electrode a4 side respectively caused by Coulomb force and so on as shown in FIG. 1 (b). In this occasion, the display surface observed from the display substrate a1 ("a" one) side of the reversible image display panel will reveal non-display condition (usually black) because a visible radiation from the backlight a10 ("a" ten) being shielded. Subsequently, when the polarity of the power source is reversed and both the A electrode a3 and the B electrode a4 are grounded, and when a voltage is applied in a manner that the C electrodes a5 correspond to negative electrodes and the D electrodes a6 correspond to positive electrodes, the group of negatively chargeable particles a7 will fly and move towards D electrodes a6 side and the group of positively chargeable particles a8 will fly and move towards the C electrodes a5 side respectively caused by Coulomb force and so on as shown in FIG. 1 (c). In this occasion, the display surface observed from the display substrate a1 ("a" one) side of the reversible image display panel will become a display condition revealing the color of the color filter a9. It renders bright and vivid color display because the backlight is employed and because gas exists in the space.

Only by reversing the polarity of the power source, the state as shown in FIG. 1 (b) and the state as shown in FIG. 1 (c) can be repeatedly realized and accordingly, the display varies reversibly. In the case where, for example, both the group of negatively chargeable particles a7 and the group of positively chargeable particles a8 are black, and where the color filter a9 is R (red), G (green) or B (blue), every color can be displayed.

Because each particle are attached to the electrodes by means of an image force in accordance with the first aspect of the invention, the display image is maintained for a long term after the power source being cut off, and memory preservation is favorable. Further, because the groups of chargeable particles fly and move in the gas by means of Coulomb force and so on, the display speed is extremely fast and the display time of shorter than 10 milliseconds may be possible.

Figure 2:
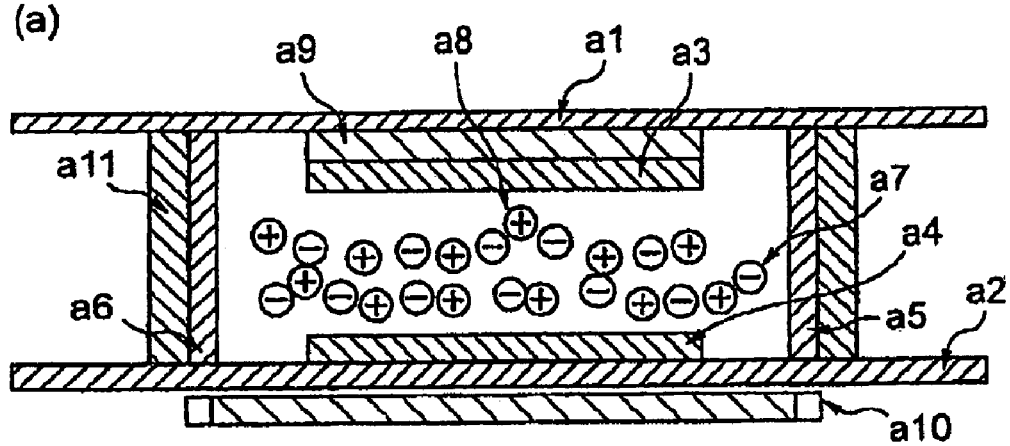
Figure 2:
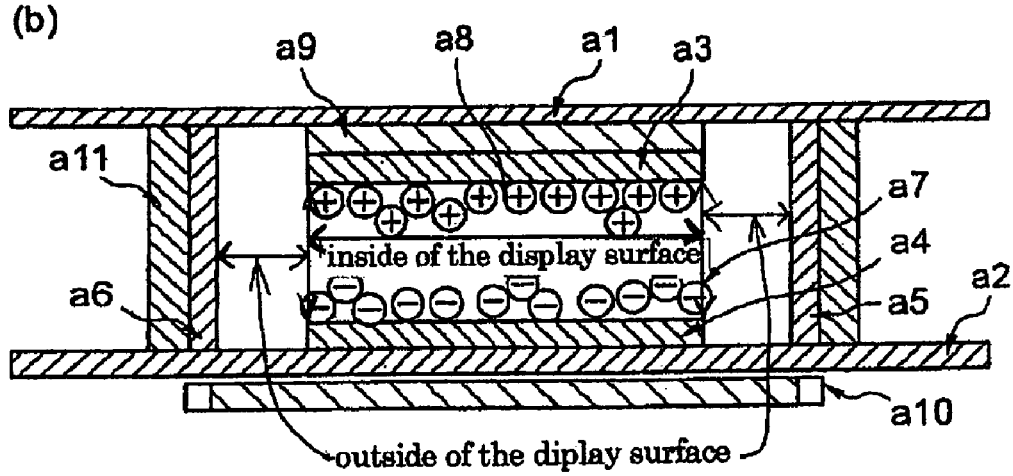
Figure 2:
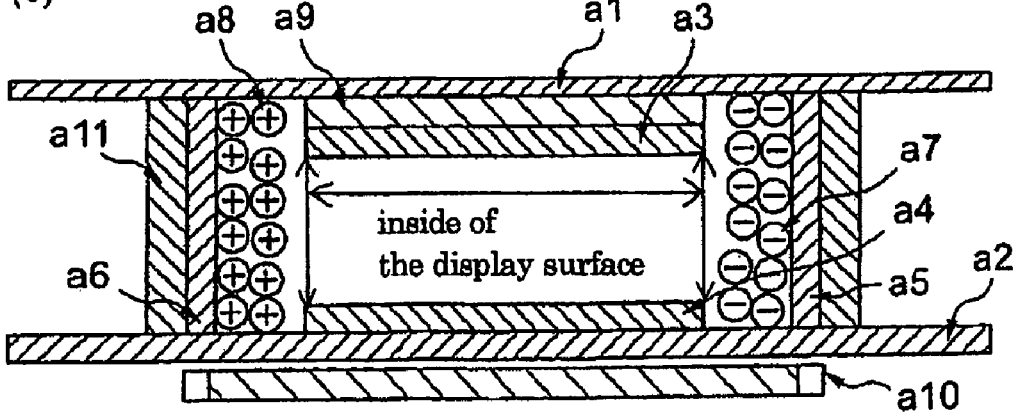

FIG. 2 illustrates the case where C electrode a5 and D electrode a6 are disposed inside of partition walls a11 ("a" eleven) respectively. FIG. 2 (a) illustrates the situation that the group of negatively chargeable particles a7 and the group of positively chargeable particles a8 are enclosed between a pair of facing transparent substrates.

In this situation, when a voltage is applied from the power source in a manner that the A electrode a3 side corresponds to a negative electrode and the B electrode a4 side corresponds to a positive electrode, the group of positively chargeable particles a8 will fly and move towards the A electrode a3 side and the group of negatively chargeable particles a7 will fly and move towards B electrode a4 side respectively caused by Coulomb force and so on as shown in FIG. 2 (b). In this occasion, the display surface observed from the display substrate a1 ("a" one) side of the reversible image display panel will reveal non-display condition (usually black) because a visible radiation from the backlight a10 ("a" ten) being shielded. Subsequently, when the polarity of the power source is reversed and both the A electrode a3 and the B electrode a4 are grounded, and when a voltage is applied in a manner that the C electrode a5 corresponds to a positive electrode and the D electrode a6 corresponds to a negative electrode, the group of negatively chargeable particles a7 will fly and move towards C electrode a5 side and the group of positively chargeable particles a8 will fly and move towards the D electrode a6 side respectively caused by Coulomb force and so on as shown in FIG. 2 (c). In this occasion, the display surface observed from the display substrate a1 ("a" one) side of the reversible image display panel will become a display condition revealing the color of the color filter a9.

Only by reversing the polarity of the power source, the state as shown in FIG. 2 (b) and the state as shown in FIG. 2 (c) can be repeatedly realized and accordingly, the display varies reversibly.

With regards to the substrate, both the display substrate a1 ("a" one) and the opposed substrate a2 must be transparent substrates capable of recognizing the displaying color from outside of the display panel, and a material with great transmission factor of visible light and with excellent heat resistance is preferable.

The A electrode and the B electrode are formed of electroconductive materials which are transparent and having pattern formation capability, metals such as aluminum, silver, nickel, copper, and gold, or transparent electroconductive metal oxides such as ITO, electroconductive tin oxide, and electroconductive zinc oxide formed in the shape of thin film by sputtering method, vacuum vapor deposition method, CVD (Chemical Vapor Deposition) method, and coating method, or coated materials obtained by applying the mixed solution of an electroconductive agent with a solvent or a synthetic resin binder are used.

Typical examples of the electroconductive material include cationic polyelectrolyte such as benzyltrimethylammonium chloride, tetrabutylammonium perchlorate, and so on, anionic polyelectrolyte such as polystyrenesulfonate, polyacrylate, and so on, or electroconductive fine powders of zinc oxide, tin oxide, or indium oxide.

Additionally, the thickness of the electrode may be suitable unless the electroconductivity is absent or any hindrance exists in optical transparency, and it is preferable to be 3 to 1000 nm, more preferable to be 5 to 400 nm.

The foregoing transparent electrode materials can be employed as the C electrodes and the D electrodes, however, non-transparent electrode materials such as aluminum, silver, nickel, copper, and gold can be also employed.

Outside application of the voltage across the electrodes may be DC or DC superposed with AC.

It is desirable that each electrode is formed of an insulating coat layer not to allow the dissipation of electric charges from the charged particles. It is particularly favorable that the coat layer employs resin of negative chargeability for positively chargeable particles and that the coat layer employs resin of positive chargeability for negatively chargeable particles, because the electric charge of the charged particles become hard to escape.

The particles employed in the reversible image display panel of the first aspect of the invention, may be composed of any material satisfying properties such as capable of being charged, etc. They can be formed, for example, from resin, charge control agent, coloring agent, and inorganic additive or coloring agent singly, etc.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. For the purpose of controlling the attaching force with the substrate, acryl urethane resin, acryl silicone resin, acryl fluorocarbon polymers, acryl urethane silicone resin, acryl urethane fluorocarbon polymers, fluorocarbon polymers, silicone resin are particularly preferable. Two kinds or more of these may be mixed and used.

Examples of the electric charge control agent include, but not particularly specified to, negative charge control agent such as salicylic acid metal complex, metal-containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative.

Examples of the positive charge control agent include nigrosine dye, triphenylmethane compound, the fourth grade ammonium salt compound, polyamine resin, imidazole derivatives, etc.

Additionally, metal oxides such as ultra-fine particles of silica, ultra-fine particles of titanium oxide, ultra-fine particles of alumina, and so on; nitrogen-containing circular compound such as pyridine, and so on, and these derivatives or salts; and resins containing various organic pigments, fluorine, chlorine, nitrogen, etc. can be employed as the electric charge control agent.

As for a coloring agent, various kinds of organic or inorganic pigments or dye as will be described below are employable:

Examples of black pigments include carbon black, copper oxide, manganese dioxide, aniline black, and activated carbon.

Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, and tartrazinelake.

Examples of orange pigments include red chrome yellow, molybdenum orange, permanent orange GTR, pyrazolone orange, Balkan orange, Indusren brilliant orange RK, benzidine orange G, and Indusren brilliant orange GK.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, and brilliant carmine 3B.

Examples of purple pigments include manganese purple, first violet B, and methyl violet lake.

Examples of blue pigments include Berlin blue, cobalt blue, alkali blue lake, Victoria blue lake, phthalocyanine blue, metal-free phthalocyanine blue, partially chlorinated phthalocyanine blue, first sky blue, and Indusren blue BC.

Examples of green pigments include chrome green, chromium oxide, pigment green B, Malachite green lake, and final yellow green G.

Further, examples of white pigments include zinc white, titanium oxide, antimony white, and zinc sulphide.

Examples of extenders include baryta powder, barium carbonate, clay, silica, white carbon, talc, and alumina white.

Furthermore, there are Nigrosine, Methylene Blue, rose bengal, quinoline yellow, and ultramarine blue as various dyes such as basic dye, acidic dye, dispersion dye, direct dye, etc.

These coloring agents may be used alone or in combination of two or more kinds thereof.

Particularly, carbon black is preferable as the black coloring agent, and titanium oxide is preferable as the white coloring agent.

Although the manufacturing method of the particles is not specifically restricted, mixing/grinding method or polymerization method for producing toner of electrophotography is, for example, similarly employable. Further, the method of coating resin or charge control agent and so on over the surface of powders such as inorganic or organic pigments is also employable.

In the reversible image display panel of the first aspect of the invention, plural of the foregoing display element are disposed in a matrix form, and images can be displayed.

In the case of monochrome display, one display element makes one pixel. In the case of full color display, three kinds of display elements, i.e., one group of display elements each having color plate of R (red), G (green) and B (blue) respectively and each having particles of black composes a set of disposed elements preferably resulting in the reversible image display panel having the sets of the elements.

The second aspect of the invention provides a reversible image display panel which comprises a pair of substrates one of which is transparent and a group of particles having single color and charged with single polarity enclosed between the substrates, characterized in applying an electric field across the substrates, and displaying images by flying and moving the particles.

In the present invention, an attracting force caused by Coulomb force between particles each other, an electric imaging force with an electrode plate, an intermolecular force, further, a solution cross-linking force, gravities and so on are considered as the force applied on the particles.

The structures and operating principles about embodiments of the reversible image display elements in the reversible display panel of the second aspect of the present invention will be described with regards to the drawings below.

Figure 4:
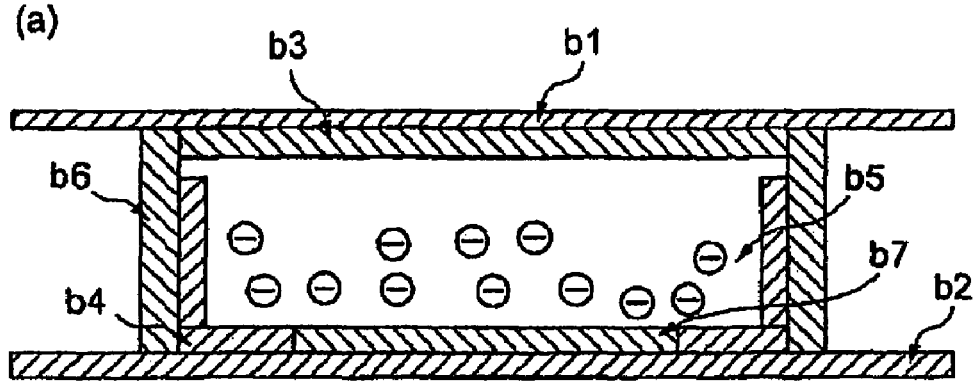
FIGS. 4 to 6 are drawings each illustrating structures and operating principles about embodiments of the reversible image display elements in the reversible display panel of the second aspect of the present invention.
Figure 4:
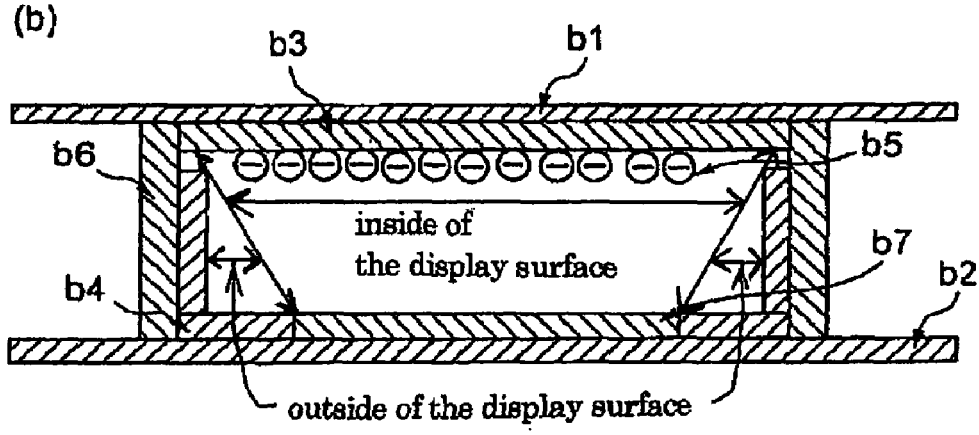
Figure 4:
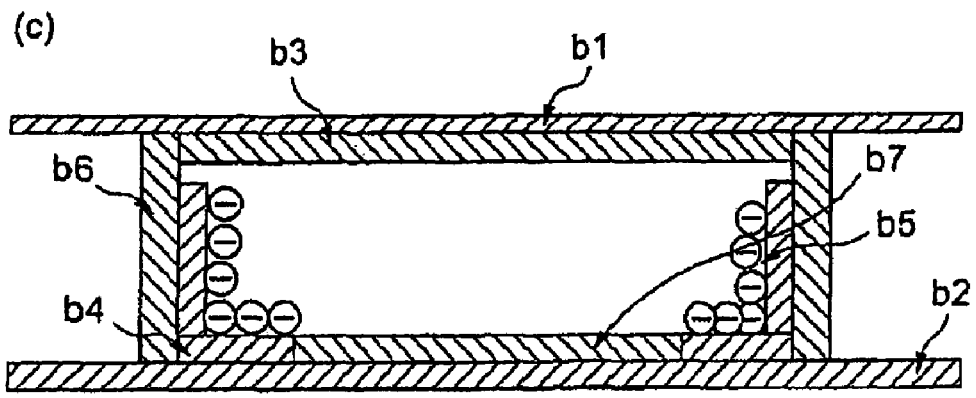

FIG. 4 illustrates the case where a transparent display electrode b3 is disposed inside (opposite side against an opposed substrate) of a transparent substrate b1; and both counter electrodes b4 and color plate b7 are disposed inside (opposite side against the transparent substrate) the opposed substrate b2. Additionally, as shown in the drawings, the counter electrode may be disposed even insides of partition walls b6. Further, the counter electrodes b4 may be disposed only inside of opposed substrate b2, or only insides of partition walls b6.

FIG. 4 (a) illustrates the situation that a group of negatively chargeable particles b5 is enclosed between a pair of facing substrates.

In this situation, when a voltage is applied from the power source in a manner that the display electrode b3 side corresponds to a positive electrode and the counter electrodes b4 sides correspond to negative electrodes, the group of negatively chargeable particles b5 will fly and move towards the transparent electrode b1 side caused by Coulomb force and so on as shown in FIG. 4 (b). In this occasion, the display surface observed from the transparent substrate b1 side of the reversible image display panel will become a display condition revealing the color of the group of negatively chargeable particles b5. Subsequently, when the polarity of the power source is reversed and when a voltage is applied in a manner that the display electrode b3 corresponds to a negative electrode and the counter electrodes b4 correspond to positive electrodes, the group of negatively chargeable particles b5 will fly and move towards the opposed substrate b2 side caused by Coulomb force and so on as shown in FIG. 4 (c). In this occasion, the display surface observed from the transparent substrate b1 side of the reversible image display panel will become a display condition revealing the color of the color plate b7.

Only by reversing the polarity of the power source, the state as shown in FIG. 4 (b) and the state as shown in FIG. 4 (c) can be repeatedly realized and accordingly, the displaying color varies reversibly only by reversing the polarity of the power source. In the case where, for example, the negatively chargeable particles b5 are white and the color plate b7 is black and in the case where the negatively chargeable particles b5 are black and the color plate b7 is white, the display reversibly reveals white and black.

Figure 5:
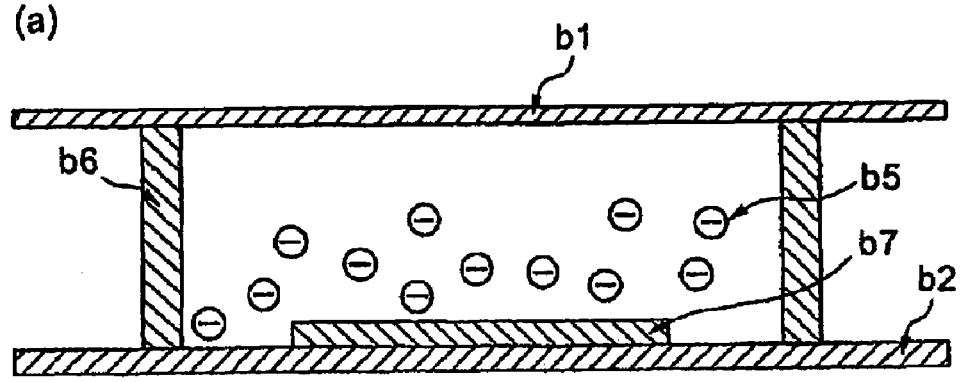
Figure 5:
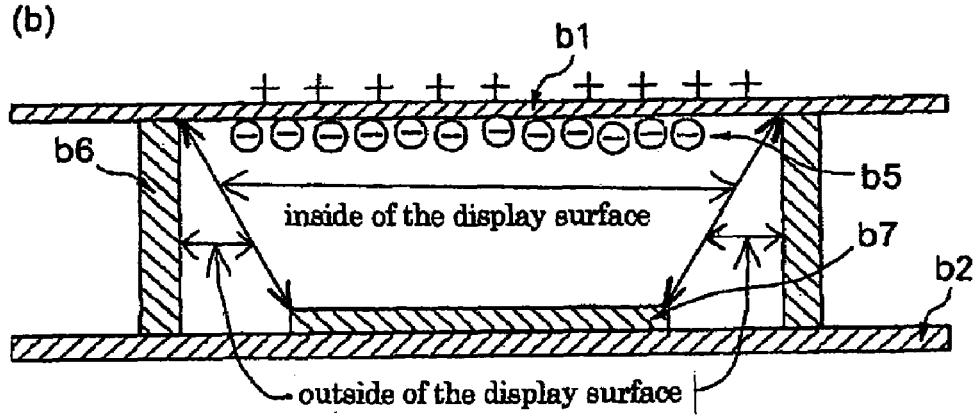
Figure 5:
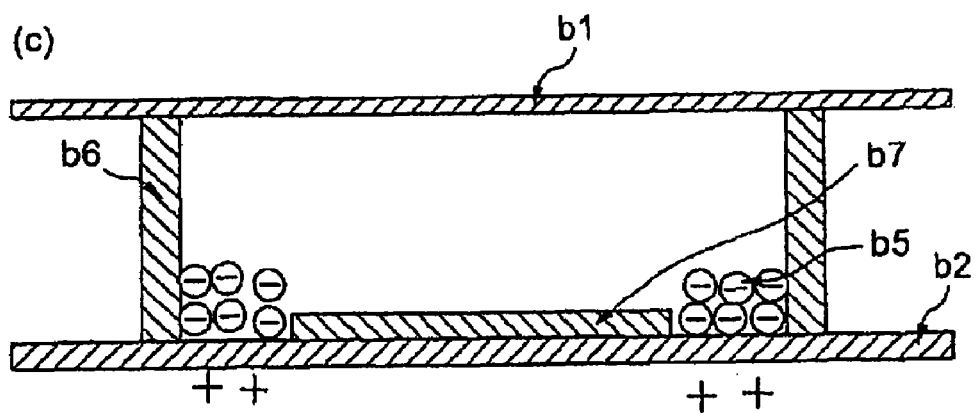

FIG. 5 illustrates the case where the electrodes are disposed isolated from the substrates, for example, outside of either edges, partition walls, or the substrates. The group of negatively chargeable particles b5 and color plate b7 as the display elements of the display panel are disposed between the transparent substrate b1 and the opposed substrate b2.

In the case of a displaying method where the electrodes are disposed not on the substrates but isolated from the substrates, an electrostatic latent image is formed over the outer surface of the substrate.

By attracting the colored particles charged with the predetermined characteristic caused by an electric field that generates depending on the electrostatic latent image to the substrates, or repelling them from the substrates, arranged particles corresponding to the electrostatic latent image are viewed from outside of the image display device through the transparent substrate. The formation of the electrostatic latent image may be achieved by transferring the electrostatic latent image formed with an ordinary electrophotography system with the use of electrophotographic photoreceptor over the image display substrate of the second aspect of the invention, or by a direct formation of it with the use of ion-flow or an electrostatic recording head. FIG. 5 (a) illustrates the situation that the group of negatively chargeable particles b5 are enclosed between a pair of facing substrates, FIG. 5 (b) illustrates the situation that the transparent substrate side being positive electric field, and FIG. 5 (c) illustrates the situation that the transparent substrate side being positive electric field. The operating principle is the same as the case where the electrodes are disposed on the substrate in FIG. 4. Of course, a group of positively chargeable particles are also capable of reversibly displaying equally.

Figure 6:
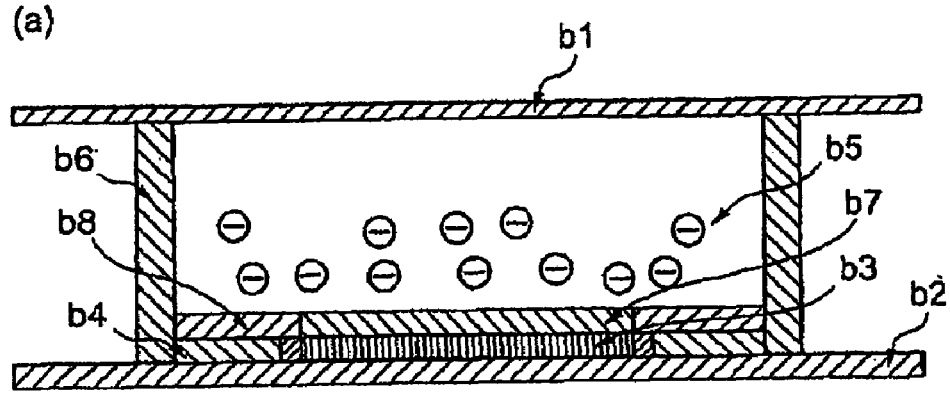
Figure 6:
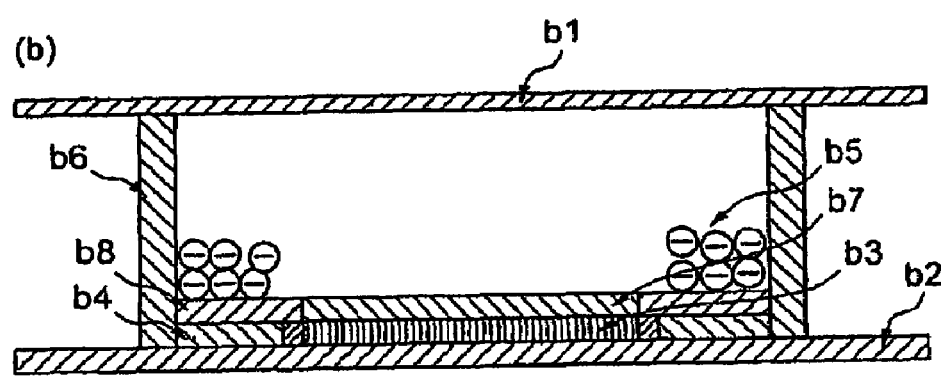
Figure 6:
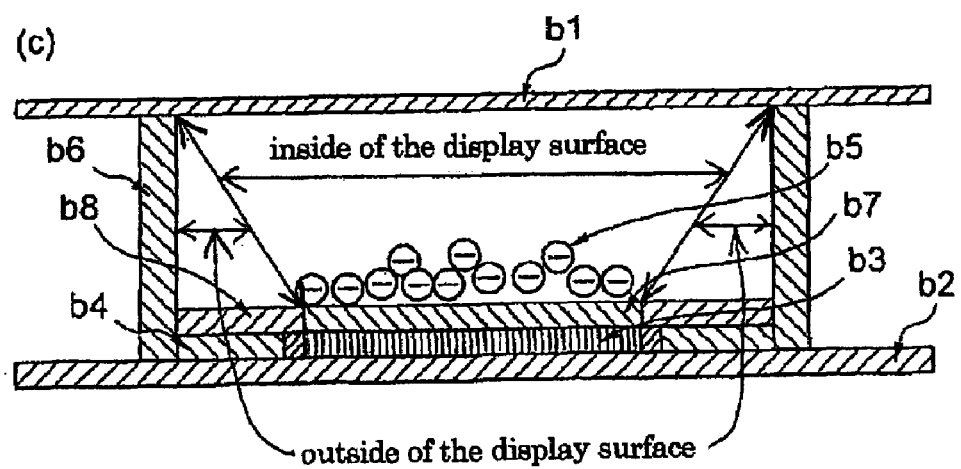

FIG. 6 illustrates the case where display electrode b3, counter electrodes b4, color plate b7, and insulating articles b8 are disposed on one side of the opposed substrate b2 being opposite to the transparent substrate b1. As shown in FIG. 6 (a), the group of negatively chargeable particles b5 is enclosed between the facing substrates. In this situation, when a voltage is applied from the power source in a manner that the display electrode b3 corresponds to a negative electrode and the counter electrodes b4 correspond to positive electrodes, the group of negatively chargeable particles b5 will fly and move towards the counter electrodes b4 sides caused by Coulomb force and so on as shown in FIG. 6 (b). In this occasion, the display surface observed from the transparent substrate b1 side of the reversible image display panel will become a display condition revealing the color of the color plate b7. Subsequently, when the polarity of the power source is reversed and when a voltage is applied in a manner that the display electrode b3 corresponds to a positive electrode and the counter electrodes b4 correspond to negative electrodes, the group of negatively chargeable particles b5 will fly and move towards the display substrate b3 side caused by Coulomb force and so on as shown in FIG. 6 (c). In this occasion, the display surface observed from the transparent substrate b1 side of the reversible image display panel will become a display condition revealing the color of the negatively chargeable particles b5.

Only by reversing the polarity of the power source, the state as shown in FIG. 6 (b) and the state as shown in FIG. 6 (c) can be repeatedly realized and accordingly, the displaying color varies reversibly only by reversing the polarity of the power source.

The foregoing description was illustrated the case where the group of negatively chargeable particles work, however, even a case with the use of a group of positively chargeable particles can compose the reversible image display panel based on the same principle.

Because each particle are attached to the electrode by means of an image force in accordance with the second aspect of the invention, the display image is maintained for a long term after the power source being cut off, and memory preservation is favorable.

With regards to the substrate, at least one substrate must be transparent substrate capable of recognizing the displaying color from outside of the display panel, and a material with great transmission factor of visible light and with excellent heat resistance is preferable. The opposed substrate may be transparent or may be opaque.

In the case where the electrodes are disposed on the substrates as shown in FIG. 4 or FIG. 6, the electrodes are formed of electroconductive materials which are transparent and having pattern formation capability, metals such as aluminum, silver, nickel, copper, and gold, or transparent electroconductive metal oxides such as ITO, electroconductive tin oxide, and electroconductive zinc oxide formed in the shape of thin film by sputtering method, vacuum vapor deposition method, CVD (Chemical Vapor Deposition) method, and coating method, or coated materials obtained by applying the mixed solution of an electroconductive agent with a solvent or a synthetic resin binder are used.

Typical examples of the electroconductive material include cationic polyelectrolyte such as benzyltrimethylammonium chloride, tetrabutylammonium perchlorate, and so on, anionic polyelectrolyte such as polystyrenesulfonate, polyacrylate, and so on, or electroconductive fine powders of zinc oxide, tin oxide, or indium oxide.

The thickness of the electrode may be suitable unless the electroconductivity is absent or any hindrance exists in optical transparency, and it is preferable to be 3 to 1000 nm, more preferable to be 5 to 400 nm.

In addition, transparent electrode materials can be employed as the opposed substrate, however, non-transparent electrode materials such as aluminum, silver, nickel, copper, and gold may be also employed.

Outside application of the voltage across the electrodes may be DC or DC superposed with AC.

It is desirable that each electrode is formed of an insulating coat layer not to allow the dissipation of electric charges from the charged particles. It is particularly favorable that the coat layer employs resin of negative chargeability for positively chargeable particles and that the coat layer employs resin of positive chargeability for negatively chargeable particles, because the electric charge of the charged particles become hard to escape.

The particles employed in the reversible image display panel of the second aspect of the invention are with single color, and white particles or black particles are preferably employable.

They may be composed of any material satisfying properties such as capable of being charged, etc. They can be formed, for example, from resin, charge control agent, coloring agent, and inorganic additive or coloring agent singly, etc.

Regarding with the manufacturing method for the resin, charge control agent, coloring agent and the particles, any method exemplified as employable for manufacturing the particles in the reversible image display panel of the first aspect of the invention is applicable.

In the reversible image display panel of the second aspect of the invention, it is preferable that at least any member being in contact with the particles is formed from a material having contact surface chargeable with reverse charge characteristic against the particles. Namely, a member having contact surface of positively chargeable is preferably employed as against the negatively chargeable particles, and a member having contact surface of negatively chargeable is preferably employed as against the positively chargeable particles. As a result, the charged state of the particles is stably maintained. The member may be any of a substrate, an electrode, a partition wall or a color plates each being in contact with the particles. Of course, the member may be either entirely formed of a material to be charged with reverse charge characteristic against the particles or formed by covering with a material to be charged with reverse charge characteristic against the particles over the portion on the surface where the particles contact.

In the reversible image display panel of the second aspect of the invention, plural of the foregoing display element are disposed in a matrix form, and images can be displayed. In the case of monochrome display, one display element makes one pixel. When the black particles are employed as the particles, the color plate is settled to be white; and when the white particles are employed as the particles, the color plate is settled to be black; thereby displaying monochrome images. In the case where arbitrary color except black and white is required to be displayed, the combination of the color between the particles and the color plate should be appropriately selected. In the case of full color display, three kinds of display elements, i.e., one group of display element each having color plate of R (red), G (green) and B (blue) respectively and each having particles of black composes a set of disposed elements preferably resulting in the reversible image display panel having the sets of the elements.

The third aspect of the invention provides a reversible image display panel which comprises a pair of facing transparent substrates comprising a backlight, two kinds of electrodes, and a color filter, further comprises a group of particles charged with single polarity enclosed between the substrates, characterized in applying an electric field across the substrates, and displaying images by flying and moving the particles.

The structures and operating principles about embodiments of the reversible image display elements in the reversible display panel of the third aspect of the present invention will be described with regards to the drawings below.

In this system, an attracting force caused by Coulomb force between particles each other, an electric imaging force with an electrode plate, an intermolecular force, further, a solution cross-linking force, gravities and so on are considered as the force applied on the particles.

Figure 7:
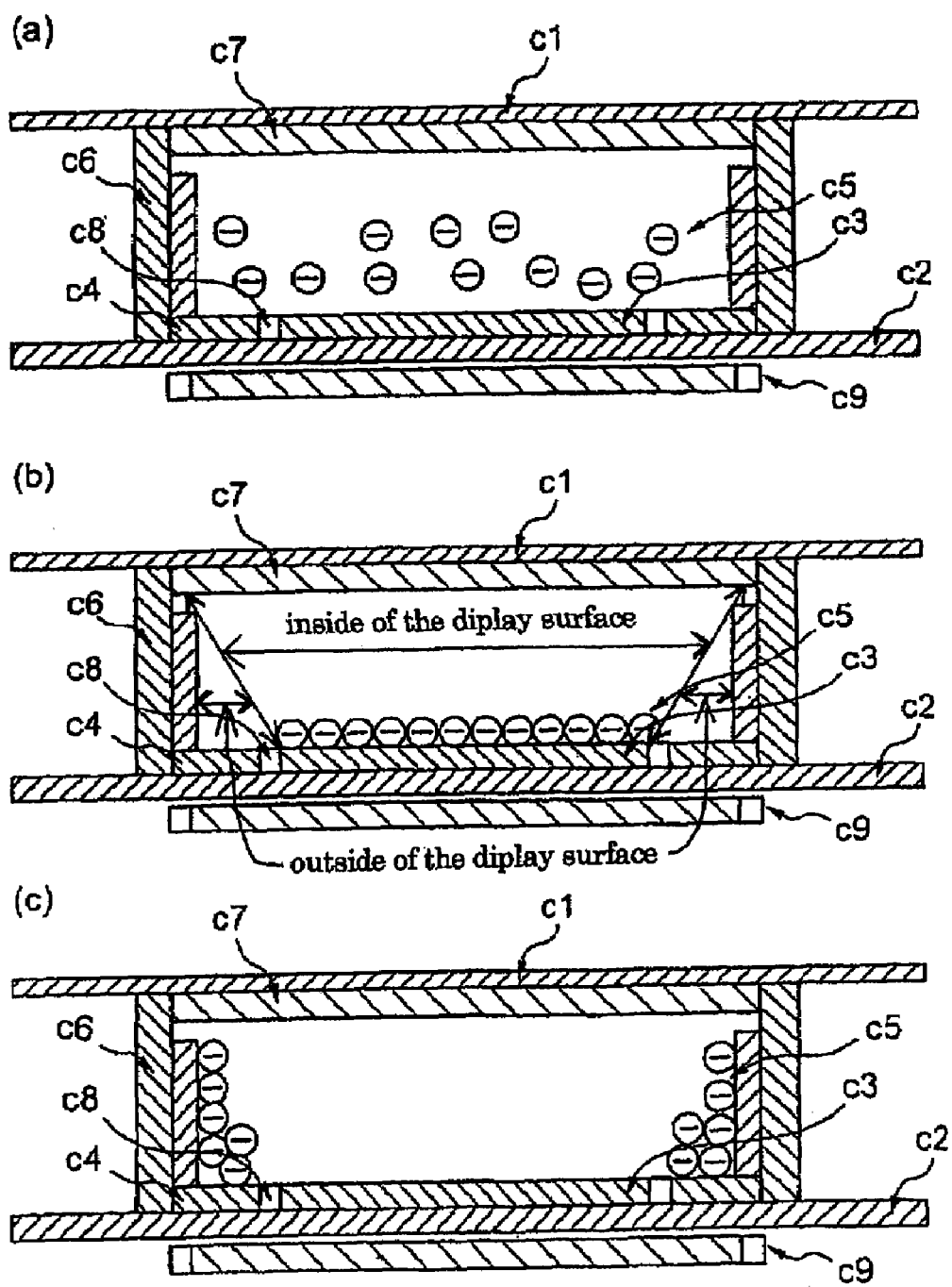
FIGS. 7 and 8 are drawings each illustrating structures and operating principles about embodiments of the reversible image display elements in the reversible display panel of the third aspect of the present invention.

FIG. 7 illustrates the case where color filter c7 is disposed inside (opposite side against an opposed substrate) of display substrate c1, and both transparent display electrode c3 and counter electrodes c4 separated by insulating articles c8 are disposed inside (opposite side against the display substrate) of the opposed transparent substrate c2. They are illuminated from outside of the opposed transparent substrate c2 by means of backlight c9. Further, as shown in the drawings, counter electrodes c4 may be disposed insides of the partition walls c6.

FIG. 7 (a) illustrates the situation that a group of negatively chargeable particles c5 is enclosed between a pair of facing substrates.

In this situation, when a voltage is applied from the power source in a manner that the display electrode c3 corresponds to a positive electrode and the counter electrodes c4 correspond to negative electrodes, the group-of negatively chargeable particles c5 will fly and move towards the opposed transparent substrate c2 side caused by Coulomb force and so on as shown in FIG. 7 (b). In this occasion, the display surface observed from the transparent display substrate cl side of the reversible image display panel will reveal non-display condition (usually black) because a visible radiation from the backlight c9 being shielded by the group of negatively chargeable particles c5. Subsequently, when the polarity of the power source is reversed and when a voltage is applied in a manner that the display electrode c3 corresponds to a negative electrode and the counter electrodes c4 correspond to positive electrodes, the group of negatively chargeable particles c5 will fly and move towards the counter electrodes c4 side caused by Coulomb force and so on as shown in FIG. 7 (c). In this occasion, the display surface observed from the transparent substrate c1 side of the reversible image display panel will reveal displaying condition because a visible radiation from the backlight c9 is capable of passing through the color filter c7, resulting in rendering the color of the color filter c7.

Only by reversing the polarity of the power source, the state as shown in FIG. 7 (b) and the state as shown in FIG. 7 (c) can be repeatedly realized and accordingly, the display varies the colors reversibly by reversing the polarity of the power source in this manner. In the case where, for example, the negatively chargeable particles c5 are black, and where the color filter c7 is R (red), G (green) or B (blue), every color can be displayed.

Figure 8:
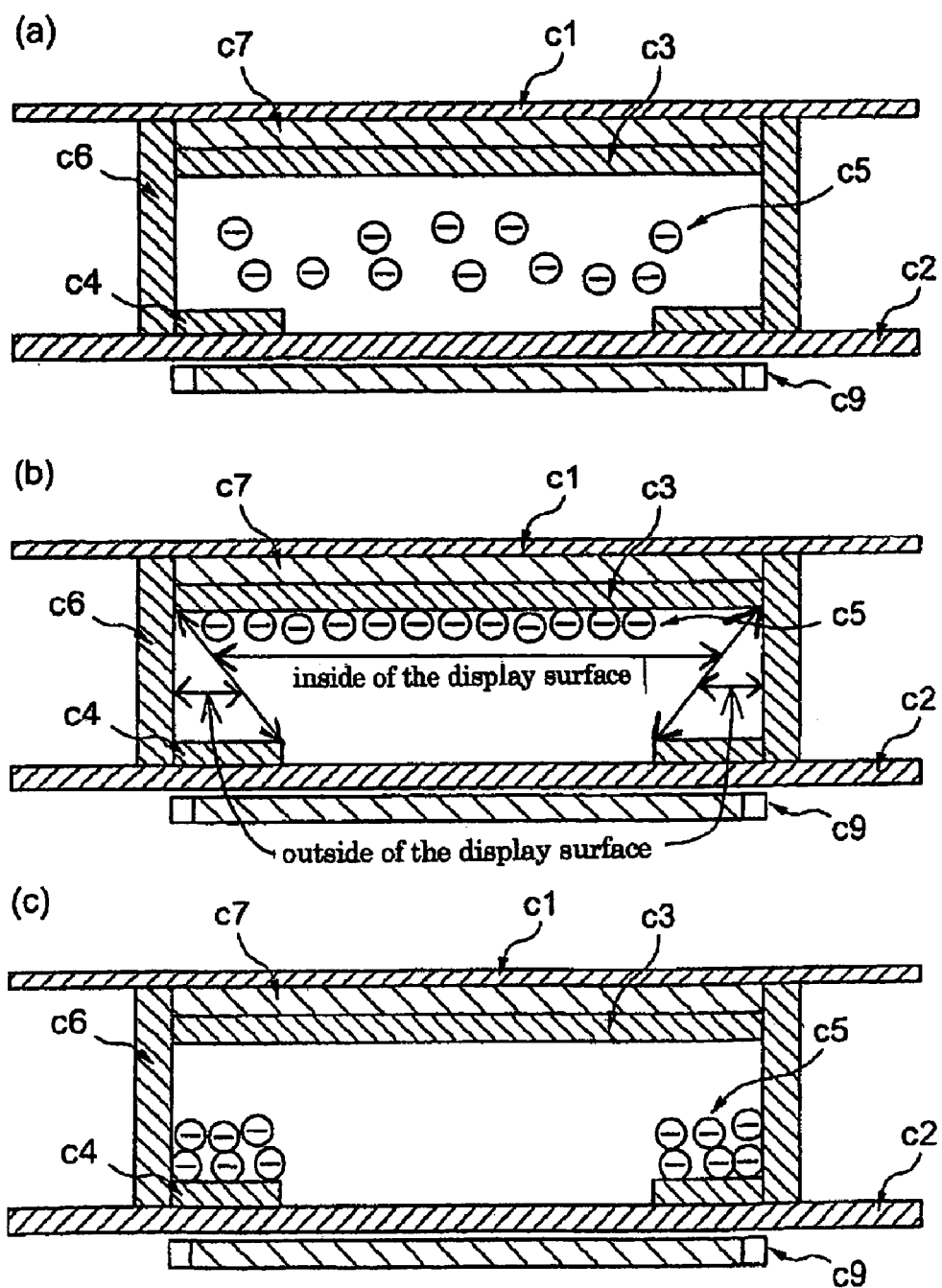

FIG. 8 illustrates the case where display electrode c3 is disposed at transparent display substrate cl side, and FIG. 8 (a) illustrates the situation that the group of negatively chargeable particles c5 is enclosed between a pair of facing substrates.

In this situation, when a voltage is applied from the power source in a manner that the display electrode c3 side corresponds to a positive electrode and the counter electrodes c4 side correspond to negative electrodes, the group of negatively chargeable particles c5 will fly and move towards the transparent substrate cl side caused by Coulomb force and so on as shown in FIG. 8 (b). In this occasion, the display surface observed from the transparent display substrate cl side of the reversible image display panel will reveal non-display condition (usually black) because a visible radiation from the backlight c9 being shielded by the group of negatively chargeable particles c5. Subsequently, when the polarity of the power source is reversed and when a voltage is applied in a manner that the display electrode c3 corresponds to a negative electrode and the counter electrodes c4 correspond to positive electrodes, the group of negatively chargeable particles c5 will fly and move towards the counter electrodes c4 side caused by Coulomb force and so on as shown in FIG. 8 (c). In this occasion, the display surface observed from the transparent substrate c1 side of the reversible image display panel will reveal displaying condition because a visible radiation from the backlight c9 is capable of passing through the color filter c7, resulting in rendering the color of the color filter c7.

Only by reversing the polarity of the power source, the state as shown in FIG. 8 (b) and the state as shown in FIG. 8 (c) can be repeatedly realized and accordingly, the display varies the colors reversibly by reversing the polarity of the power source in this manner. In the case where, for example, the negatively chargeable particles c5 are black, and where the color filter c7 is R (red), G (green) or B (blue), every color can be displayed.

The foregoing description illustrated the case where the group of negatively chargeable particles work, however, even a case with the use of a group of positively chargeable particles can compose the reversible image display panel based on the same principle.

Because each particle are attached to the electrodes by means of an image force in accordance with the third aspect of the invention, the display image is maintained for a long term after the power source being cut off, and memory preservation is favorable.

With regards to the substrate, both the display substrate and the opposed substrate must be transparent substrate capable of recognizing the displaying color from outside of the display panel, and a material with great transmission factor of visible light and with excellent heat resistance is preferable.

The display electrode of this case is formed of electroconductive materials which are transparent and having pattern formation capability on a transparent substrate, and metals such as aluminum, silver, nickel, copper, and gold, or transparent electroconductive metal oxides such as ITO, electroconductive tin oxide, and electroconductive zinc oxide formed in the shape of thin film by sputtering method, vacuum vapor deposition method, CVD (Chemical Vapor Deposition) method, and coating method, or coated materials obtained by applying the mixed solution of an electroconductive agent with a solvent or a synthetic resin binder are used.

Typical examples of the electroconductive material include cationic polyelectrolyte such as benzyltrimethylammonium chloride, tetrabutylammonium perchlorate, and so on, anionic polyelectrolyte such as polystyrenesulfonate, polyacrylate, and so on, or electroconductive fine powders of zinc oxide, tin oxide, or indium oxide. The thickness of the electrode may be suitable unless the electroconductivity is absent or any hindrance exists in optical transparency, and it is preferable to be 3 to 1000 nm, more preferable to be 5 to 400 nm. Non-transparent electrodes of copper, gold and so on may be formed on the opposed substrate. In addition, transparent electrode materials can be employed as the opposed substrate, however, non-transparent electrode materials such as aluminum, silver, nickel, copper, and gold can be also employed.

Outside application of the voltage across the electrodes may be DC or DC superposed with AC.

It is desirable that each electrode is formed of an insulating coat layer not to allow the dissipation of electric charges from the charged particles. It is particularly favorable that the coat layer employs resin of negative chargeability for positively chargeable particles and that the coat layer employs resin of positive chargeability for negatively chargeable particles, because the electric charge of the charged particles become hard to escape.

The particles employed in the reversible image display panel of the third aspect of the invention, may be composed of any material satisfying properties such as capable of being charged, etc. They can be formed, for example, from resin, charge control agent, coloring agent, and inorganic additive or coloring agent singly, etc.

Regarding with the manufacturing method for the resin, charge control agent, coloring agent and the particles, any method exemplified as employable for manufacturing the particles in the reversible image display panel of the first aspect of the invention is applicable.

In the reversible image display panel of the third aspect of the invention, it is preferable that at least any member being in contact with the particles is formed from a material having contact surface chargeable with reverse charge characteristic against the particles. Namely, a member having contact surface of positively chargeable is preferably employed as against the negatively chargeable particles, and a member having contact surface of negatively chargeable is preferably employed as against the positively chargeable particles. As a result, the charged state of the particles is stably maintained. The member may be any of a substrate, an electrode, a partition wall or a color plates each being in contact with the particles. Of course, the member may be either entirely formed of a material to be charged with reverse charge characteristic against the particles or formed by covering with a material to be charged with reverse charge characteristic against the particles over the portion on the surface where the particles contact.

In the reversible image display panel of the third aspect of the invention, plural of the foregoing display element are disposed in a matrix form, and images can be displayed.

In the case of monochrome display, one display element makes one pixel. When the black particles are employed as the particles, the color plate is settled to be white; and when the white particles are employed as the particles, the color plate is settled to be black; thereby displaying monochrome images. In the case where arbitrary color except black and white is required to be displayed, the combination of the color between the particles and the color plate should be appropriately selected. In the case of full color display, three kinds of display elements, i.e., one group of display element each having color plate of R (red), G (green) and B (blue) respectively and each having particles of black composes a set of disposed elements preferably resulting in the reversible image display panel having the sets of the elements.

The fourth aspect of the invention provides a reversible image display panel which comprises a pair of facing substrates one of which is transparent, a color plate disposed on any one of the substrate, at least two pairs of facing electrodes and two groups of particles with different charge characteristics enclosed between the substrates, characterized in applying voltage across the substrates in a manner that the electric potential on one electrode is higher than the electric potential on another electrode, and displaying images by flying and moving the particles caused by the electric field induced by the applied voltage.

Referring to the drawings, detailed description of the preferred embodiment of the fourth aspect of the invention will now be explained.

Figure 9:
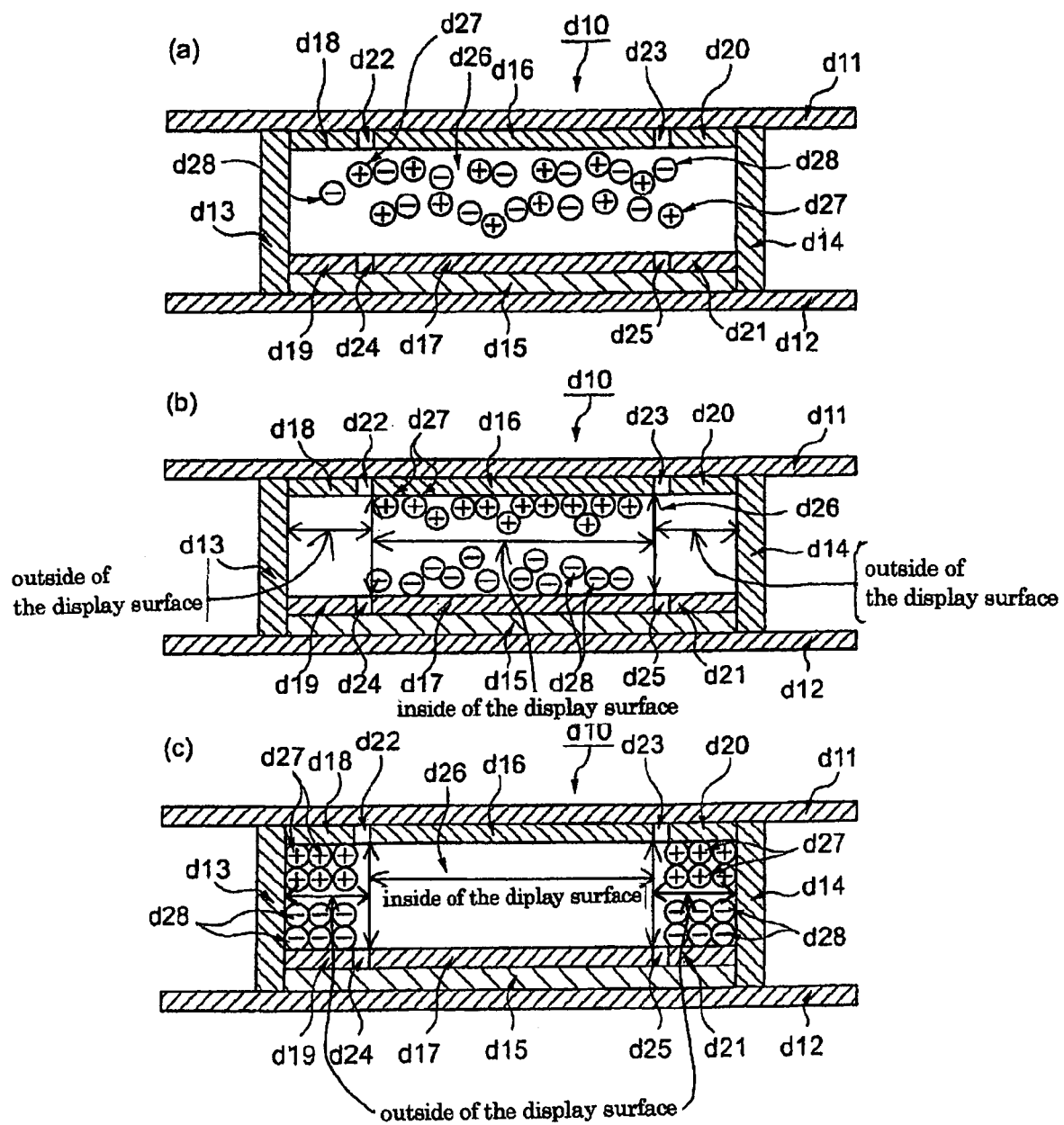
FIGS. 9 and 10 are drawings each illustrating structures and operating principles about embodiments of the reversible image display elements in the reversible display panel of the fourth aspect of the present invention.

FIG. 9 schematically illustrates structures about embodiments of the image display cells in the reversible image display panel of the fourth aspect of the invention. A display panel d10 comprises partition walls d13 & d14 between a pair of facing substrates d11 & d12, and disposes color plate d15 on the substrate d12. Further, first pair of opposing electrodes d16 & d17, second pair of opposing electrodes d18 & d19 and third pair of opposing electrodes d20 & d21 are disposed on the substrates d11 & d12 respectively, the electrodes being insulated by insulators d22 to d25 respectively between each other. Additionally, the substrate d11 should be transparent, and the substrate d12 should be opaque in the display panel d10, thereby enabling to observe display from the substrate d11 side with the use of reflected radiation of incident light from the substrate d11 side. Furthermore, among the pairs of opposing electrodes, the first pair of opposing electrodes d16 & d17 should be transparent electrodes; however, the second and the third pairs of opposing electrodes may be opaque. Moreover, each electrode in the same substrate side of the second and the third pairs of electrodes are preferable to be formed in a manner that a voltage is simultaneously applied on them, for example, to be integrated in a way that they surround the electrodes on the same substrate side of the first pair of opposing electrodes.

In this way, two or more groups of particles d27, d28 and so on are enclosed in a cell d26 sectioned by means of substrates d11 & d12 and partition walls d13 & d14. These groups of particles d27, d28 and so on are respectively chargeable with a different polarity as will be described below. A plus sign (+) is attached to the group of particles d27 as positively chargeable and a minus sign (−) is attached to the group of particles d28 as negatively chargeable respectively. In the display panel d10, one display cell is designed to be composed in this way. Further, inside of the cell d26 is filled with gas. Furthermore, the groups of particles d27 and d28 are assumed to be colored with the same color.

FIG. 9 (a) illustrates the situation that no voltage is applied to all pairs of opposing electrodes. In this occasion, because no electric field exists on the groups of particles d27 and d28 in the cell d26, they do not integrate either on the substrate d11 side or on the substrate d12 side. Additionally, the drawing illustrates the existence of the particles schematically as far as possible, and in fact, they may subside towards, for example, the substrate d12 side drawn by their weight of themselves.

In this situation, when a voltage is applied on the pair of opposing electrodes d16 and d17 in a manner that the electrode d16 has relatively lower electric potential, on the other hand, that the electrode d17 has relatively higher electric potential than the other, the group of positively charged particles d27 will move towards the electrode d16 side and the group of negatively charged particles d28 will move towards the electrode d17 side respectively caused by the electric field generated in the cell d26 as shown in FIG. 9 (b). As a result, the display color of the cell d26 observed through the substrate d11 will be a color of the particles d27.

Subsequently, cutting down the voltage applied to the first pair of opposing electrodes d16 and d17, the voltage is instead applied to the second and the third pairs of opposing electrodes. In this situation, when a voltage is applied in a manner that the electrodes d18 & d20 have relatively lower electric potential and that the electrodes d19 & d21 have relatively higher electric potential than the others, the group of positively charged particles d27 will move towards the electrodes d18 & d20 sides and the group of negatively charged particles d28 will move towards the electrodes d19 & d21 sides respectively caused by the electric field generated in the cell d26 as shown in FIG. 9 (c). As a result, the display color of the cell d26 observed through the substrate d11 will be a color of the color plate d15.

By switching the pair of opposing electrodes to which the voltage is applied, the state as shown in FIG. 9 (b) and the state as shown in FIG. 9 (c) can be repeatedly mutually exchangeable and accordingly, the display varies reversibly in this manner. Further, full color display becomes possible by composing a pixel with a group of cells having color plates d15 of red, blue and green respectively and each having particles of black.

Because each particles d27 & d28 are attached to the electrodes d16 & d17 by means of an image force in the display element d10, the display image is maintained for a long term after the power source being cut off, unless the movement of the particles is promoted by the application of the voltage and so on to the other pair of opposing electrodes. In this regard, the image force means a force that generates between two charged substances caused by the charges of opposite polarity generated over the surface of counter substance in the case where one charged substance approach to the other substance. Therefore, the memory retention of image data becomes favorable. Further, movement of particles d27 and d28 may be fastened by filling the cell d26 with gas, thereby, for example, it is possible to obtain a response speed of 1 millisecond or shorter.

Figure 10:
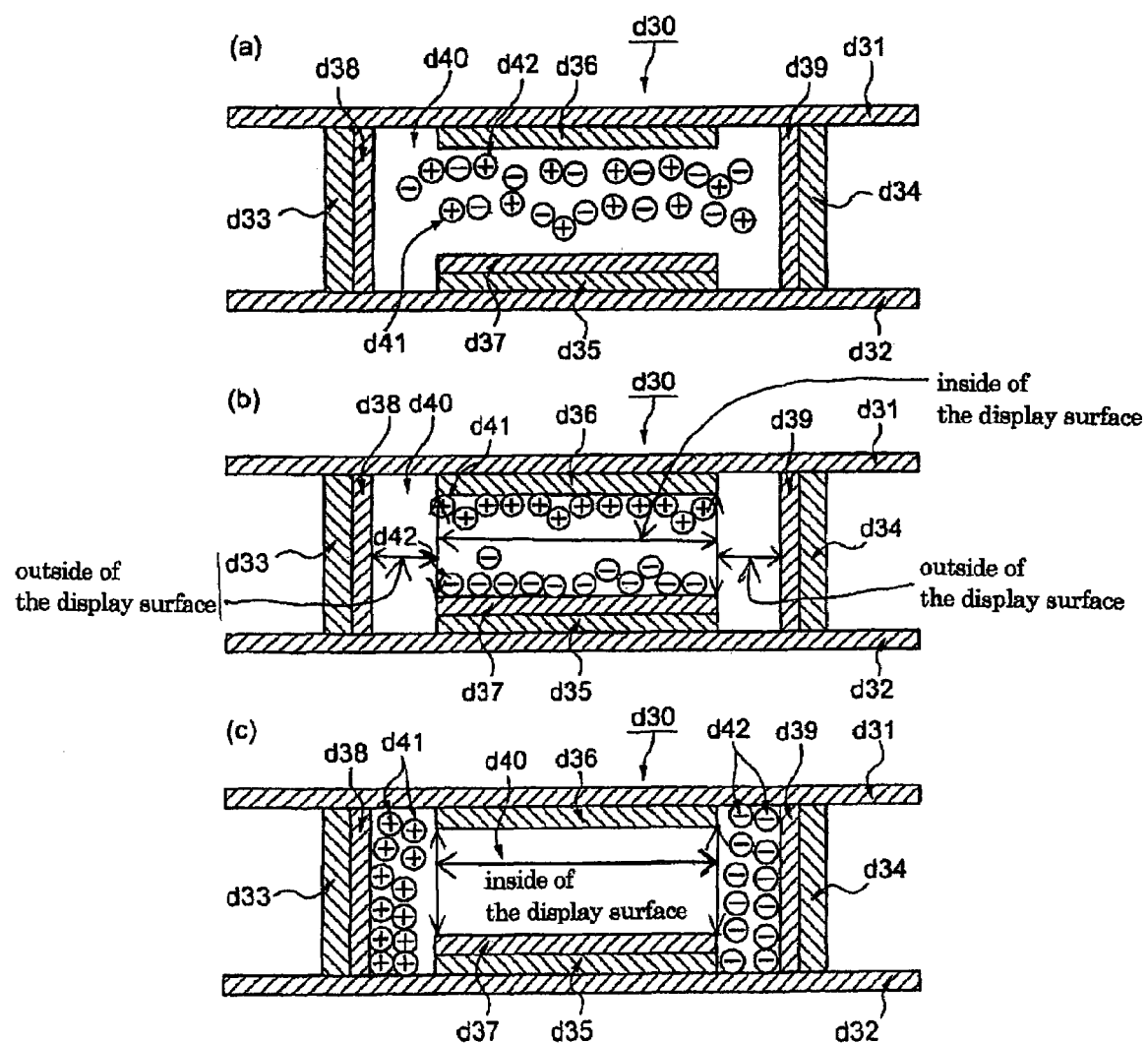

FIG. 10 schematically illustrates structures about the second embodiments of the image display cells in the reversible image display panel of the fourth aspect of the invention. A display panel d30 also comprises partition walls d33 & d34 between a pair of facing substrate d31 & d32, and disposes color plate d35 on the substrate d32. The display panel d30 further comprises the first pair of opposing electrodes d36 & d37 on the substrate d31 & d32 respectively, and the second pair of opposing electrodes d38 & d39 on the partition walls d33 & d34 respectively. Additionally, the substrate d31 should be transparent, and the substrate d32 should be opaque in the display panel d30, thereby enabling to observe display from the substrate d31 side with the use of reflected radiation of incident light from the substrate d31 side. Furthermore, among the pairs of opposing electrodes, the first pair of opposing electrodes d36 & d37 should be transparent electrodes, however, the second pair of opposing electrodes d38 & d39 may be opaque.

In this way, two or more groups of particles d41, d42 and so on are enclosed in a cell d40 sectioned by means of substrates d31, d32, and partition walls d33 & d34. These groups of particles d41, d42, and so on are respectively chargeable with a different polarity as will be described below. A plus sign (+) is attached to the group of particles d41 as positively chargeable and a minus sign (−) is attached to the group of particles d42 as negatively chargeable respectively. In the display panel d30, one display cell is designed to be composed in this way. Further, inside of the cell d40 is filled with gas. Furthermore, the particles d41 and d42, are assumed to be colored with the same color.

FIG. 10 (a) illustrates the situation that no voltage is applied to all pairs of opposing electrodes. In this occasion, because no electric field exists on the groups of particles d41 and d42, in the cell d40, they do not integrate either on the substrate d31 side or on the substrate d32 side. Additionally, the drawing illustrates the existence of the particles schematically as far as possible, and in fact, they may subside towards, for example, the substrate d32 side drawn by their weight of themselves.

In this situation, when a voltage is applied on the pair of opposing electrodes d36 and d37 in a manner that the electrode d36 has relatively lower electric potential, on the other hand, that the electrode d37 has relatively higher electric potential than the other, the group of positively charged particles d41 will move towards the electrode d36 side and the group of negatively charged particles d42 will move towards the electrode d37 side respectively caused by the electric field generated in the cell d40 as shown in FIG.

10 (*b*). As a result, the display color of the cell d40 observed through the substrate d31 will be a color of the particles d41.

Subsequently, cutting down the voltage applied to the first pair of opposing electrodes d36 & d37, and instead, the voltage is applied to the second pairs of opposing electrodes d38 and d39. In this situation, when a voltage is applied in a manner that the electrode d38 has relatively lower electric potential and that the electrode d39 has relatively higher electric potential than the other, the group of positively charged particles d41 will move towards the electrodes d38 side and the group of negatively charged particles d42 will move towards the electrode d39 side respectively caused by the electric field generated in the cell d40 as shown in FIG. 10 (*c*). As a result, the display color of the cell d40 observed through the substrate d31 will be a color of the color plate d35.

By switching, the pair of opposing electrodes to which the voltage is applied, the state as shown in FIG. 10 (*b*) and the state as shown in FIG. 10 (*c*) can be repeatedly mutually exchangeable and accordingly, the display varies reversibly in this manner even in the illustrated display panel d30. Further, full color display becomes possible by composing a pixel with a group of three cell having color plates d35 of red, blue and green respectively and each having particles of black.

With regards to the substrate used for the display panel of the fourth aspect of the invention must be transparent substrate capable of recognizing the displaying color from outside of the display panel, and a material with great transmission factor of visible light and with excellent heat resistance is preferable as described in the foregoing embodiments.

Next, with regard to the material to be used for the electrode, transparent and electroconductive materials which are having pattern formation capability should be employed for the first pair of the opposing electrodes as described about the foregoing first and second embodiments. Accordingly, the pairs of opposing electrodes are provided by using electroconductive metal oxides such as ITO, electroconductive tin oxide, and electroconductive zinc oxide, formed in the shape of thin film by sputtering method, vacuum vapor deposition method, CVD (Chemical Vapor Deposition) method, and coating method are used, or coating a mixed solution of the electroconductive material with a solvent or a synthesized resin binder.

Typical examples of the electroconductive material include cationic polyelectrolyte such as benzyltrimethylammonium chloride, tetrabutylammonium perchlorate, and so on, anionic polyelectrolyte such as polystyrenesulfonate, polyacrylate, and so on, or fine powders of zinc oxide, tin oxide, or indium oxide.

The thickness of the electrode may be suitable unless the electroconductivity is absent or any hindrance exists in optical transparency, and accordingly, it is preferable to be 3 to 1000 nm, more preferable to be 5 to 400 nm.

Further, although a transparent electrode may be employed as the second and the third pair of opposing electrodes in the same way as the first pair of opposing electrodes, non-transparent electrode materials such as aluminum, silver, nickel, copper, and gold can be also employed because these do not give direct influence on the transmission of the light.

Further, in the case where a voltage is applied on the pair of facing electrodes from outside, the voltage may be DC or DC superposed with AC. Furthermore, it is desirable that each electrode is formed of an insulating coat layer not to allow the dissipation of electric charges from the charged particles. It is particularly favorable that the coat layer employs resin of negative chargeability for positively chargeable particles and that the coat layer employs resin of positive chargeability for negatively chargeable particles, because the electric charge of the charged particles become hard to escape.

As the method for charging the particles, a corona discharge method, an electrode injection-charge method, a friction charge method and so on are employable, however, a simple and easy method comprises mixing at least two kinds of particles with different charge characteristic and friction charging them by bringing them into contact.

Regarding the particles in the reversible image display panel of the fourth aspect of the invention, they may be composed of any material satisfying properties such as capable of being charged, etc. They can be formed, for example, from resin, charge control agent, coloring agent, and inorganic additive or coloring agent singly, etc.

Regarding with the manufacturing method for the resin, charge control agent, coloring agent and the particles, any method exemplified as employable for manufacturing the particles in the reversible image display panel of the first aspect of the invention is applicable.

In the reversible image display panel of the fourth aspect of the invention, many foregoing display cells are formed and disposed in a matrix form. In the case of monochrome display, one display element makes one pixel. In the case of full color display, three kinds of display elements, i.e., one group of display element each having color plate of R (red), G (green) and B (blue) respectively and each having particles of black composes a set of disposed cells makes a pixel.

The fifth aspect of the invention provides a reversible image display panel which comprises a pair of facing substrates at least one of which is transparent and a group of particles enclosed between the substrates, characterized in applying an electric field across the substrates, and displaying images by flying and moving the particles, wherein at least one kind of the particles have portions with different colors and different charge characteristics.

In order to ensure a sufficient display contrast, it is preferable to design at least one kind of the particles so that the portions with different color and different charge characteristic respectively occupy almost one-half of each particle.

Additionally, with regard to the term "contrast", it is defined as follows: namely, enclosing the particles between a pair of facing electrode plates, while enforcing the electric field powerfully by degrees, the saturated reflection density is determined as "A"; and while enforcing the electric field of reverse polarity by degrees, the saturated reflection density is determined as "B", the absolute value of the difference between A and B is defined as "contrast".

In accordance with the working principle of the image display device within the scope of the fifth aspect of invention, for example, in the case where the particles whose about one half portion of each is white and negatively chargeable, and about another half portion of each is black and positively chargeable are employed, they forward their negatively chargeable white sides for the electrode face and are fixed by Coulomb force. On the other hand, when the electric potential turns to negative, the positively chargeable black side will coordinate at the electrode side. Accordingly, by applying an electric field in a matrix form within a face, the electrode may be utilized as a display element.

In the conventional image display device using two kinds of particles with different colors and with different polarities, it was necessary for the particles to be completely isolated from the electrode plate. On the other hand, the image display device within the scope of the fifth aspect of invention is not only capable of transforming the display at a lower driving voltage but also capable of fastening the display response speed in comparison with the conventional image display device because the former is responsible on the rotation of the particles over the electrode plate or on an interchange with adjacent particles.

On the assumption that at least one kind of the particles used for the image display particles in the reversible image display panel of the fifth aspect of the invention have portions with different colors and different charge characteristics, the manufacturing method of the particles is not specifically restricted, and for example, they may be prepared in the following method.

To begin with, mixing the resin as the essential component with coloring agent, charge control agent and so on, kneading, grinding and sheeting by means of heat-press. Another sheet with a different color and a different property should be formed similarly. Putting them one upon another, further heat-pressing, stretching will form a composite laminate sheet of them. By grinding the composite laminate sheet, and further classifying, particles, whose about one half portion of each is white and about another half portion of each is black should be prepared.

In this occasion, it is preferable to select resin materials with great affinity between two kinds of material to be laminated. Further, an adhesive may be applied in order to improve the adhesion between both sheet during lamination. Furthermore, melting only the surface of the particles by instantly exposing the particles to an elevated heat may be carried out in order to making the resultant particles spherical.

Moreover, it is also possible to prepare the particles for the fifth aspect of the invention by forming a composite material by means of dichroic extrusion of two kinds of resin, followed by stretching and spinning. As the resin used for the image display particles in the reversible image display panel of the fifth aspect of the invention, a resin component of the radical polymerization type using acrylic monomer, methacrylic monomer and styrenic monomer is employable. With the use of those, the application of the polarity of either positive or negative to the particles and maintaining the charge amount will be easy.

For example, a polymer with styrene as an essential component may be employed as a negatively chargeable component, and a co-polymer of acrylic monomer or methacrylic monomer with methacrylic acid 2-(diethylamino) ethyl and so on may be employed as a positively chargeable component. As thus described, regulating the charge property is possible by the selection and the blending ratio of the monomer.

When the charge amount is poor only with the monomer, regulating the charge is possible easily by dissolving electric charge control agent into the monomer.

Typical examples of the acrylic monomer include acrylic acid monomer, methyl acrylate monomer, butyl acrylate monomer, and acrylonitrile monomer. Typical examples of the methacrylic monomer include methacrylic acid monomer, methyl methacrylate monomer, methacrylic acid n-butyl monomer, methacrylic acid t-butyl monomer, glycidyl methacrylate monomer, methacrylic acid hydroxyethyl monomer, metachloronitrile monomer, methacrylic acid 2-(diethylamino) ethyl monomer, and methacrylic acid 2-(dimethylamino) ethyl monomer. Examples of the styrenic monomer include styrene monomer and methyl styrene monomer. Moreover, two kinds or more of these monomers may be employable in combination.

The particles employed in the reversible image display panel of the fifth aspect of the invention can be formed also from other resins, charge control agent, coloring agent, inorganic additive, etc. Regarding with the manufacturing method for the resin, charge control agent, coloring agent and the particles, any method exemplified as employable for manufacturing the particles in the reversible image display panel of the first aspect of the invention is applicable.

With regards to the substrate used in the image display device of the fifth aspect of the invention, at least one of the substrates must be transparent substrate capable of recognizing the particles color from outside of the display panel, and a material with great transmission factor of visible light and with excellent heat resistance is preferable.

In the image display device of the fifth aspect of the invention, there are two cases about the substrate, namely, a case where the electrode is not established on the substrate, and a case where the electrode is established on the substrate.

In the case where the electrode is not established on the substrate, an electrostatic latent image is formed over the outer surface of the substrate, and by making the predetermined charged particles drawn or repelled towards or from the substrate in an electric field that generates corresponding to the electrostatic latent image, the particles arranged correspondent with the electrostatic latent image are observed and recognized through the transparent substrate from outside of the image display device. Additionally, with regard to the formation of the electrostatic latent image, there are a transferring formation method wherein an electrostatic latent image formed by usual electronic photography system with the use of electronic photosensitive materials is transferred on the substrate of electrostatic image display device of the fifth aspect of the invention, and a direct method wherein an electrostatic latent image is directly formed on the substrate by an ion-flow.

In the case where the electrode is established on the substrate, by making the predetermined charged particles drawn or repelled towards or from the substrate in an electric field that generates on the position of the electrodes, the particles arranged correspondent with an electrostatic latent image are observed and recognized through the transparent substrate from outside of the image display device.

Those matters that are common among the first to the fifth aspects of the invention will be described below.

Examples of the substrate material include polymer sheets such as polyethylene terephthalate, polyeter sulfone, polyethylene, or polycarbonate, and inorganic sheets such as glass, quartz or so.

The thickness of the substrate is preferably 2 to 5000 µm, more preferably 5 to 1000 µm. When the thickness is too thin, it becomes difficult to maintain strength and distance uniformity between the substrates, and when the thickness is too thick, vividness and contrast as a display capability degrade, and in particular, flexibility in the case of using for an electron paper deteriorates.

The presence of flexibility as the image display device is selected appropriately by the usage, for example, the flexible materials are selected for the usage as an electronic paper and so on, and materials without flexibility are selected for the usage as display units for portable devices such as cellular phones, PDAs, and notebook-sized personal computers.

The distance between the facing substrates is suitably adjusted in a manner where the particles can move and maintain the contrast of image display; however, it is adjusted usually within 10 to 5000 μm, preferably within 10 to 500 μm.

The volume population of the particle existing in the space between the faced substrates is preferable to be 10 to 80%, more preferable to be 10 to 60%. When the volume population exceeds 80%, it causes some troubles in the particle movement, and when it is less than 10%, contrast tends to be indistinct.

In the reversible image display panel of the present invention, it is preferable to form partition walls, namely, all ("a" eleven) in FIGS. 1 & 2, b6 in FIGS. 4 to 6, c6 in FIGS. 7 & 8, d13 & d14 in FIG. 9, and d33 & d34 in FIG. 10, around each display element. The partition walls may be formed in two parallel directions. By this structure, unnecessary particle movement in the direction parallel with the substrate is prevented. Further, durability repeatability and memory retention are assisted. At the same time, the distance between the substrates is made uniform as reinforcing the strength of an image display panel.

The formation method of the partition wall is not particularly restricted, however, a screen printing method wherein pastes are overlapped by coating repeatedly on a predetermined position by screen plate; a sandblast method wherein partition materials are painted with a desired thickness entirely over the substrate and then after coating resist pattern on the partition materials which is wanted to be left as a partition, jetting abrasive to cut and remove partition materials aside from the partition part; lift-off method (additive method) wherein a resist pattern is formed on the substrate using photopolymer, and then after burying paste into a resist recess, removing the resist; photosensitive paste method wherein the photosensitive resin composition containing the partition materials is applied over the substrate and then obtaining a desired pattern by exposure & developing; and mold formation method wherein paste containing the partition materials is applied over the substrate and then forming a partition by compression bonding & pressure forming the dies having rugged structure; and so on are adopted. Further, modifying the mold formation method, relief embossing method wherein a relief pattern provided by a photopolymer composition is used as a mold is also adopted.

Although any of colored particles negatively or positively chargeable having capability of flying and moving by Coulomb force are employable, spherical particles with light specific gravity are particularly preferable.

The average particle diameter $d_{0.5}$ is preferable to be 0.1 to 50 μm, particularly to be 1 to 30 μm. When the particle diameter is less than this range, charge density of the particles will be so large that an imaging force to an electrode and a substrate becomes too strong; resulting in poor following ability at the inversion of its electric field, although the memory characteristic is favorable. On the contrary, when the particle diameter exceeds the range, the following ability is favorable, however, the memory characteristic will degrade.

The average particle diameter $d_{0.5}$ (μm) was obtained by casting each group of particles into Mastersizer 2000 (produced by Malvern Instruments Ltd.) measuring instrument, and by means of attached software (software to calculate particle diameter distribution and particle diameter based on volume standard distribution), wherein $d_{0.5}$ represents a particle diameter (μm) defining that 50% of the particles are greater than this, and another 50% of the particles are smaller than this.

Although it is a matter of course that the charge amount of the particles depends upon the measurement condition, it is understood that the charge amount of the particles in the image display device almost depends upon initial charge amount and an attenuation accompanied by a contact with the substrate, a contact with other particles, or with an elapse of the time. It is also understood that a saturation value of charge behavior accompanying with the contact of the charged particles becomes the control factor. However, this is difficult with simplified measurement.

Inventors of the present invention measured the charge amount of the particles in accordance with the measuring method using a carrier in blow-off method, and it was found that the suitable charge amount of the particles for the image display device could be predicted by specifying the surface charge density calculated from the measured charge amount.

Regarding the measuring method for the charge amount will be described later in detail; however, the charge amount per unit weight of the particles is capable of being measured by measuring a saturated charge amount after bringing the particles and the carrier particles into contact enough each other by means of blow-off method. Then, further measuring the particle diameter and the specific gravity about the particles separately, the surface charge density of the particles can be calculated.

In the image display device, because the particle diameter of the particles used is small and the influence of gravity is too small to be ignored, specific gravity of the particles does not have influence to the movement of the particles. However, regarding the charge amount of the particles, even though the average charge amount per unit weight coincides about the particles with the same particle diameter each other, the charge amount to be held is different in 2 times in the case where the specific gravity of the particles is different in 2 times. Accordingly, it was found that the charge characteristic of the particles used for the image display device will be suitably evaluated by the surface charge density (unit: $\mu C/m^2$) without any relation with the specific gravity.

Here, it is not always preferable that the surface charge density is great. In the image display device with particle movement, it is preferable that the charge amount is few in order to move the particles in a low electric field (voltage) because when the particle diameter of the particles is large, there is the tendency that an electric imaging force corresponds to a factor mainly determining an electric field (voltage) to fly the particles. Further, when the particle diameter of the particles is small, it is preferable that the charge amount is much in order to move the particles in a low electric field (voltage) because non-electric force such as intermolecular force or liquid bridging force corresponds to the factor mainly determining the electric field (voltage) to fly the particles. In addition, because it depends upon the surface characteristics (materials, shape) of the particles greatly, it cannot be specified by merely the particle diameter and the charge amount unconditionally, however, when the surface charge density of the particles is appropriate, the particles work to move to the direction towards an electrode of different polarity by an electric field.

Inventors of the present invention measured the surface charge density of the particles in accordance with the measuring method using a carrier in blow-off method, and it was found that the suitable surface charge density of the particles with averaged particle diameter $d_{0.5}$ of 0.1 to 50 μm is in the range of 5 to 150 $\mu C/m^2$ as the absolute value of the measured surface charge density of the particles employable for the image display device. When the absolute value of the surface charge density is less than this range, response speed to the change of an electric field will be late, and the memory characteristic degrades. When the absolute value of the surface charge density exceeds this range, image force for the electrode or the substrate will be so strong that the memory characteristic will be favorable, but following ability will be poor in the case where the electric field is inverted.

Additionally, when at least two kinds of different particles are employed as the fourth aspect of the invention, it is preferable that the absolute value of the difference between the surface charge densities of each kinds of particles is in the range of 5 to 150 $\mu C/m^2$. When the difference of the absolute values is smaller than 5 $\mu C/m^2$, applying extremely great voltage will be necessary in order to achieve the flight of the particles because the force working to the particles while the electric field is applied is very weak. Further, when there are distributions among surface charge densities of each kinds of particles, and when the difference of absolute values is smaller than 5 $\mu C/m^2$, a range where the surface charge density distributions overlap between the two groups of particles will increase. Under such situation, the two kinds of particles might not be ideally separated by an application of voltage, resulting in incapability of exhibiting sufficient performance as the display device.

In the blow-off method, a mixture of the particles and the carriers are placed into a cylindrical container with nets at both ends, and high-pressure gas is blown from the one end to separate the particles and the carriers, and then only the particles are blew off from the mesh of the net. In this occasion, charge amount of reverse polarity remains on the carriers with the same charge amount of the particles carried away out of the container. Then, all of electric flux by this electric charge are collected to Faraday cage, and are charged across a capacitor with this amount. Accordingly, the charge amount of the particles is determined as $Q=C\cdot V$ (C: capacity, V: voltage across both ends of the capacitor) by measuring potential of both ends of the capacitor. And then, the surface charge density is determined from the value of this charge amount of the particles, the average particle diameter and the specific gravity of the particles each measured separately.

Although the method for charging the particles negatively or positively is not particularly limited, a corona discharge method, an electrode injection-charge method, a friction charge method and so on are employable.

Because it is necessary for the particles to hold the charged electric charge, insulating particles with the volume specific resistance of $1\times 10^{10}$ $\Omega\cdot cm$ or greater are preferable, and in particular, insulating particles with the volume specific resistance of $1\times 10^{12}$ $\Omega\cdot cm$ or greater are more preferable.

Further, the particles with slow charge attenuation property evaluated by the measuring method below are more preferable.

Namely, applying the voltage of 8 KV to a Corona generator disposed with a distance of 1 mm to the surface to generate Corona discharge, charging the surface, and then, measuring the change of the surface potential, determine the suitability. In this occasion, it is preferable to select the material whose maximum surface potential will be 300 V or greater after 0.3 seconds, more preferable to select the material whose maximum surface potential will be 400 V or greater after 0.3 second as the material for composing the particles.

Figure 3:
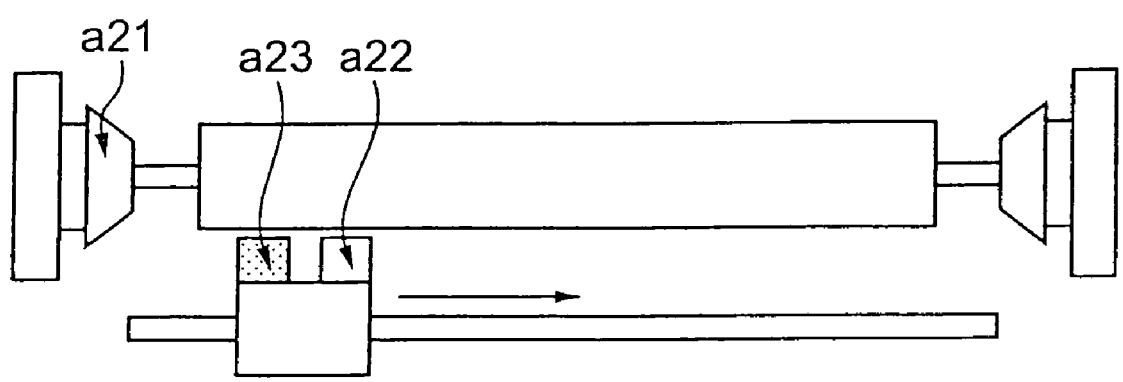
FIG. 3 is an illustration of the measuring instrument used for the measurement of surface potential of the particles in the reversible image display panel of the present invention.

Additionally, the foregoing surface potential is measured by means of an instrument (CRT2000 produced by QEA Inc.) as shown in FIG. 3. In this instrument, both end portions of a roll shaft being held with chuck a21, compact corotron discharger a22 and surface potential meter a23 are spaced with predetermined interval to form a measurement unit. Facedly deploying the measurement unit with a distance of 1 mm from the surface of the particles, and by moving the measurement unit from one end portion of the roll shaft to the other end portion with an uniform speed, with the state, that the roll shaft remains stopping and while giving surface charge, a method of measuring its surface potential is preferably adopted. Moreover, measurement environment should be settled at the temperature of 25±3° C. and the humidity of 55±5% RH.

The present invention will be described in further detail with reference to Examples and Comparative Examples, which do not limit the scope of the present invention.

Further, the evaluation about particles and the image display device obtained in Examples and Comparative Examples were carried out in accordance with the following criteria.

(1) Average Particle Diameter $d_{0.5}$ ($\mu m$)

Each group of particles was cast into Mastersizer 2000 (brand name, produced by Malvern Instruments Ltd.) measuring instrument, and by means of attached software (software to calculate particle diameter distribution and particle diameter based on volume standard distribution), an average particle diameter $d_{0.5}$ representing a particle diameter ($\mu m$) defining that 50% of the particles are greater than this, and another 50% of the particles are smaller than this was obtained.

(2) Surface Charge Density ($\mu C/m^2$)

As a blow-off powder charge amount measuring instrument, TB-200 produced by Toshiba Chemical Co., Ltd. was used. Two kinds of positively chargeable and negatively chargeable resin were employed as the carriers, and charge density per unit area (unit: $\mu C/m^2$) was measured in each case. Namely, F963-2535 available from Powder TEC Co., Ltd. was employed as a positive chargeable carrier (the carrier whose opponent is positively charged and itself tends to be negative) and F921-2535 available from Powder TEC Co., Ltd. was employed as negatively chargeable carrier (the carrier whose opponent is negatively charged and itself tends to be positive). The surface charge density of the particles was obtained from the measured charge amount, the average particle diameter and specific gravity of the particles measured separately.

In addition, the average particle diameter was measured by the foregoing method, and the specific gravity was measured with the use of a hydrometer produced by Shimadzu Seisakusho Ltd. (brand name: Multi Volume Density Meter H1305).

(3) Image Density

Raising the applied voltage between the electrode plates gradually, the reflection density (white or black) was measured with the use of Macbeth reflection image density instrument RD918 at the time when the density variation disappeared. Next, after inverting the polarity, the reflection density of opposite color (black or white) was measured in the same manner as the above description.

(4) Driving Voltage and Image Evaluation

Raising the applied voltage between the electrode plates gradually, the voltage at the time when the density variation disappeared was determined as a driving voltage. The displaying quality at each driving voltage was visually evaluated.

EXAMPLE 1

A reversible image display panel comprising a display element with a structure shown in FIGS. 1 was assembled. Glass substrates were employed as both the transparent substrate and the opposed substrate, ITO electrodes were employed as both the A electrode and the B electrode, and a copper electrodes were employed as both the C electrode and D electrode. Black polymerized toners (spherical toners with average particle diameter $d_{0.5}$ of 8 μm, surface charge density of −40 μC/m$^2$, the maximum surface potential of 450 V at 0.3 second after the foregoing surface potential measurement) for electrophotography were employed as the group of negatively chargeable particles. Black polymerized toners (spherical toners with average particle diameter $d_{0.5}$ of 8 μm, surface charge density of +45 μC/m$^2$, the maximum surface potential of 480 V at 0.3 second after the foregoing surface potential measurement) were employed as the group of positively chargeable particles. For the purpose of charging the particles, an equivalent amount of both particles were mixed and agitated and frictional charging was conducted. Settling the height of the partition walls as 200 μm, the volume population of the particles among the space between the substrates was adjusted to 50%. Additionally, red resin sheet was employed as the color filter.

When DC voltage of 200 V was applied in a manner that the C electrode side corresponded to the negative electrode and the D electrode side corresponded to the positive electrode, the group of positively chargeable particles flew and moved towards the C electrode side and attached there, further, the group of negatively chargeable particles flew and moved towards the D electrode side and attached there, and as a result, the display element rendered red. Subsequently, grounding both the C electrode and the D electrode, DC voltage of 200 V was applied in a manner that the A electrode side corresponded to the negative electrode and the B electrode side corresponded to the positive electrode, the group of positively chargeable particles flew and moved towards the A electrode side and attached there, further, the group of negatively chargeable particles flew and moved towards the B electrode side and attached there, and as a result, the display element rendered black.

The response time for the applied voltage was measured to be 1 millisecond. Even after leaving the display device cutting off the applied voltage for one day, each display was maintained.

Further, although the polarity of the applied voltage was reversed repeatedly for 10,000 times, there was almost no variation of the response speed.

EXAMPLE 2

A reversible image display panel comprising a display element with a structure shown in FIGS. 4 was assembled. Glass substrates were employed as both the transparent substrate and the opposed substrate, ITO electrode was employed as the display electrode, and copper electrodes were employed as the counter electrodes. Over the surfaces of each electrodes, insulating silicone resin was coated with the thickness of about 3 μm for the purpose of preventing both adhesion and charge leakage. Black polymerized toners (spherical toners with average particle diameter $d_{0.5}$ of 8 μm, surface charge density of −40 μC/m$^2$, the maximum surface potential of 450 V at 0.3 second after the foregoing surface potential measurement) for electrophotography were employed as the group of negatively chargeable particles. Settling the height of the partition walls as 200 μm, the volume population of the particles among the space between the substrates was adjusted to 30%. Additionally, white resin sheet was employed as the color plate.

When DC voltage of 200 V was applied in a manner that the display electrode side corresponded to the positive electrode and the counter electrodes side corresponded to the negative electrodes, the group of negatively chargeable particles flew towards the display electrode side and attached there, and as a result, the display element rendered black. Then, when the polarity of the applied voltage was reversed, the particles flew towards the counter electrodes side and attached there, and as a result, the display element rendered white.

The response time for the applied voltage was measured to be 1 millisecond. Even after leaving the display device cutting off the applied voltage for one day, each display was maintained.

Further, although the polarity of the applied voltage was reversed repeatedly for 100,000 times, there was almost no variation of the response speed.

EXAMPLE 3

A reversible image display panel comprising a display element with a structure shown in FIGS. 7 was assembled. Glass substrates were employed as both the transparent substrate and the opposed substrate, ITO electrode was employed as the display electrode, and copper electrodes were employed as the counter electrodes. Over the surfaces of each electrodes, insulating silicone resin was coated with the thickness of about 3 μm for the purpose of preventing both adhesion and charge leakage. Black polymerized toners (spherical toners with average particle diameter $d_{0.5}$ of 8 μm, surface charge density of −40 μC/m$^2$, the maximum surface potential of 450 V at 0.3 second after the foregoing surface potential measurement) for electrophotography were employed as the group of negatively chargeable particles. Settling the height of the partition walls as 200 μm, the volume population of the particles among the space between the substrates was adjusted to 40%. Additionally, red resin sheet was employed as the color filter.

When DC voltage of 200 V was applied in a manner that the display electrode side corresponded to the positive electrode and the counter electrodes side corresponded to the negative electrode, the group of negatively chargeable particles flew towards the display electrode side and attached there, and as a result, the display element rendered black. Then, when the polarity of the applied voltage was reversed, the particles flew towards the counter electrodes side and attached there, and as a result, the display element rendered red.

The response time for the applied voltage was measured to be 1 millisecond. Even after leaving the display device cutting off the applied voltage for one day, each display was maintained.

Further, although the polarity of the applied voltage was reversed repeatedly for 100,000 times, there was almost no variation of the response speed.

EXAMPLE 4

A display device having display cell d10 with a structure shown in FIGS. 9 was assembled. A glass sheet was employed as the substrate d11, and an epoxy sheet was employed as the opposed substrate d12. ITO was employed as the first pair of opposing electrodes d15 & d16, and coppers were employed as the second pair of opposing electrodes d18 & d19, and as the third pair of opposing electrodes d20 & d21.

Black polymerized toners (spherical toners with average particle diameter $d_{0.5}$ of 8 μm, surface charge density of +45 μC/m$^2$, surface potential of 480 V after 0.3 second) were employed as the group of positively chargeable particles d27. On the other hand, black polymerized toners (spherical toners with average particle diameter $d_{0.5}$ of 8 μm, surface charge density of −40 μC/m$^2$, surface potential of 450 V after 0.3 second) were employed as the group of negatively chargeable particles d28. For the purpose of charging each particle, an equivalent amount of both particles were mixed and agitated and frictional charging was conducted.

Further, the height of the partition walls d13 & d14, that is, the distance between the substrate d11 and substrate d12 was settled to be 200 μm, and volume population of the particles between the substrates was adjusted to 50%. Additionally, white resin sheet was employed as the color plate d15.

In the display cell d10 assembled as the foregoing description, DC voltage of 200 V was applied in a manner that one electrode d18 of the second pair of opposing electrodes and one electrode d20 of the third pair of opposing electrodes corresponded to negative electrodes; and the other electrodes d19 and d21 corresponded to positive electrodes. Then, as shown in FIG. 9 (c), the group of positively charged particles d27 flew and moved towards the electrodes d18 & d20, and on the other hand, the group of negatively charged particles d28 moved towards electrodes d19 & d21 and attached there. As a result, the display color of display cell d10 rendered white which was the same color as the color plate d15.

Subsequently, all of the second and the third pairs of opposing electrodes were grounded and the applied voltage was discontinued, and instead, DC voltage of 200 V was applied in a manner that one electrode d16 of the first pair of opposing electrodes corresponded to negative electrodes; and the other electrode d17 corresponded to positive electrode. Then, as shown in FIG. 9 (b), the group of positively charged particles d27 flew and moved towards the electrodes d16 and attached there, and on the other hand, the group of negatively charged particles d28 moved towards electrodes d17 and attached there. As a result, the display color of display cell d10 rendered black which was the same color as the particles d27 & d28.

In the foregoing cases, the response time for the applied voltage was measured to be 1 millisecond. Further, even after leaving the display panel cutting off the applied voltage for one day, each display was maintained, i.e., the particles were still attached to each electrode sides. Furthermore, although the polarity of the applied voltage was reversed repeatedly for 10,000 times, there was almost no variation of the response speed.

EXAMPLE 5

As a preparation of the particles composing negatively charged portions, AIBN (azo bis iso butyronitrile) in an amount of 0.5 part by weight was dissolved in styrene monomer, and the mixed solution was dispersed in 0.5% surfactant (lauryl sodium sulfate) aqueous solution of a quantity of 10 times, and they were suspended and polymerized into polystylene resin solution. "BONTRON E84" (available from Hodogaya Chemical Co., Ltd.) in an amount of 5% by weight as charge control agent and titanium oxide "CR 50" (available from Ishihara Sangyo Co., Ltd.) in an amount of 20 part by weight as coloring agent were dissolved into 100 part by weight of the polystylene resin solution, and after filtering and drying them, negatively charged white particles of 5 to 10 μm were obtained with the use of grinding classifier (FM-120, produced by Japan Pnewmatic Co., Ltd.).

As a preparation of the particles composing positively charged portions, AIBN (azo bis iso butyronitrile) in an amount of 0.5 part by weight was dissolved in 80 part by weight of methyl methacrylate monomer and 20 part by weight of methacrylic acid 2-(dimethylamino)ethyl monomer, and 20 part by weight of the lipophilicated titanium oxide by coupling treatment was dispersed. The mixed solution was dispersed in 0.5% surfactant (lauryl sodium sulfate) aqueous solution of a quantity of 10 times, and they were suspended and polymerized into acrylic styrene resin solution. "BONTRON N21" (available from Hodogaya Chemical Co., Ltd.) in an amount of 5% by weight as charge control agent and carbon black "# 45" (available from Mitsubishi Carbon Co., Ltd.) in an amount of 5 part by weight as coloring agent were dissolved into 100 part by weight of the acrylic styrene resin solution, and after filtering and drying them, positively charged black particles of 5 to 10 μm were obtained with the use of grinding classifier (FM-120, produced by Japan Pnewmatic Co., Ltd.).

The average particle diameter $d_{0.5}$ and average charge amount of primary particles are shown in Table 1.

Then, the primary particles were respectively heat-pressed into sheet at the temperature of 140° C. and the resultant sheets were superposed, pressurized and laminated into a laminate sheet at the temperature of 160° C. The resultant sheet was heatedly stretched with the use of stretching machine and a laminate sheet with the thickness of 10 μm was obtained. Grinding the resultant laminate sheet minutely and particles having average particle diameter $d_{0.5}$ of about 10 μm were obtained. About one-half of the particles were white and another about one-half of the particles were black. Further, with the use of Suffusion System (SFS -03; produced by Japan Pnewmatic Co., Ltd.), the surface of the particles were finely fused with hot blast temperature of 450° C., thereby obtained spherical particles.

Among a cell made by assembling a glass substrate whose inside was ITO treated and another copper substrate disposed with a spacer of 100 μm, the particles above were enclosed by the cavity factor of 50%, a display device was obtained.

The ITO glass substrate and the copper substrate were connected to a power source respectively, and when DC voltage was applied in a manner that the former corresponded to a negative electrode and the latter corresponded to positive electrode, the image density was measured.

The evaluation results about the image density, the driving voltage and the image quality are shown in Table 2.

REFERENCE EXAMPLE 1

The primary particles obtained in Example 5 were classified and enclosed among a cell consisting of a glass substrates inside of which is ITO-treated and a copper substrate assembled with a spacer of 100 μm, adjusting the space factor in the cell to 50%, two particles-type image display device was obtained.

The evaluation results about the image density, the driving voltage and the image quality are shown in Table 2.

TABLE 1

|  |  |  | Primary particles |
|---|---|---|---|
| Negatively chargeable particles | Particle diameter | $d_{0.5}$ (μm) Span | 9.4 0.90 |
|  | Average surface charge density (μC/m$^2$) |  | −42.4 |
|  | Color |  | White |
| Positively chargeable particles | Particle diameter | $d_{0.5}$ (μm) Span | 9.9 0.80 |
|  | Average surface charge density (μC/m$^2$) |  | 38.9 |
|  | Color |  | Black |

TABLE 2

|  | Example 5 | Reference Example 1 |
|---|---|---|
| Image density while entirely rendering white | 0.64 | 0.56 |
| Image density while entirely rendering black | 1.72 | 1.75 |
| Driving voltage (V) | 45 | 250 |
| Image quality evaluation | Excellent without unevenness | Excellent without unevenness |

INDUSTRIAL APPLICABILITY

The reversible image display panel and the image display device in accordance with the present invention have fast response speed and simple structure, being superior in stability and vividity. In an occasion of driving, generation of the strong electric field is unnecessary for them and accordingly, electric circuits can be assembled employing general purpose electronic materials. They are applicable to the image display unit for mobile equipments such as notebook-sized personal computers, PDAs, and so on; to the bulletin boards such as signboards, posters, blackboards, and so on; and to the image display unit for electronic calculators or home electric appliance products.

What is claimed is:

1. A reversible image display panel which comprises: a pair of facing transparent substrates comprising a backlight, a color filter and two pairs of electrodes, further comprising two groups of particles with different charge characteristics enclosed between the substrates, characterized in applying an electric field across the substrates, and displaying images by flying and moving the particles, wherein the surface charge density of the particles measured and calculated by the use of a carrier and in accordance with blow-off method is within a range of 2 to 150 μC/m$^2$ in an absolute value.

2. A reversible image display panel which comprises a pair of substrates one of which is transparent and a group of particles having single color and charged with single polarity enclosed between the substrates, characterized in applying an electric field across the substrates, and displaying images by flying and moving the particles, wherein the surface charge density of the particles measured and calculated by the use of a carrier and in accordance with blow-off method is within the range of 5 to 150 μC/m$^2$ in an absolute value.

3. A reversible image display panel which comprises a pair of facing transparent substrates comprising a backlight, two kinds of electrodes, and a color filter, further comprises a group of particles charged with single polarity enclosed between the substrates, characterized in applying an electric field across the substrates, and displaying images by flying and moving the particles, wherein the surface charge density of the particles measured and calculated by the use of a carrier and in accordance with blow-off method is within the range of 5 to 150 μC/m$^2$ in an absolute value.

4. The reversible image display panel according to claim 1, 2 or 3, wherein the particles have volume specific resistance of $1 \times 10^{10}$ Ω·cm or greater.

5. The reversible image display panel according to claim 1, 2 or 3, wherein the particles have the maximum surface potential in the case where the surfaces of the particles are charged by a generation of a Corona discharge caused by applying a voltage of 8 kV onto a Corona discharge device deployed at a distance of 1 mm from the surface of each particle is 300 V or greater at 0.3 second after the discharge.

6. The reversible image display panel according to claim 1, 2 or 3 characterized in displaying images by flying and moving the particles in gas.

* * * * *